United States Patent [19]

Chung et al.

[11] Patent Number: 4,672,634
[45] Date of Patent: Jun. 9, 1987

[54] ARRANGEMENT FOR GENERATING AN ANGLE-MODULATED CARRIER SIGNAL OF CONSTANT AMPLITUDE IN RESPONSE TO DATA SIGNALS

[75] Inventors: Kah-Seng Chung; Klaas M. Boschma, both of Eindhoven, Netherlands

[73] Assignee: U.S. Philips Corporation, New York, N.Y.

[21] Appl. No.: 755,640

[22] Filed: Jul. 16, 1985

[30] Foreign Application Priority Data

Jul. 23, 1984 [NL] Netherlands ............ 8402319

[51] Int. Cl.⁴ ............................................. H03C 3/04
[52] U.S. Cl. ................................. 375/62; 332/16 R; 455/110
[58] Field of Search .................. 375/44, 45, 46, 47, 375/52, 53, 62, 67, 65; 332/1, 16 R, 23 A, 18; 364/718; 455/110, 112, 113

[56] References Cited

U.S. PATENT DOCUMENTS 3,935,386  1/1976  Glasson et al. ............ 375/53
4,229,821  10/1980 de Jager et al. ............ 375/53
4,327,439  4/1982  Göckler et al. ............ 375/54

Primary Examiner—Benedict V. Safourek
Attorney, Agent, or Firm—Marianne Rich; William J. Streeter; Anne E. Barschall

[57] ABSTRACT

An arrangement for generating an analog angle-modulated carrier signal of a substantially constant amplitude in response to data signals having a symbol rate 1/T comprises a read-only memory for storing modulation parameters, an addressing circuit responsive to a predetermined number of consecutive data symbols for producing read addresses with a rate q/T, where q is an integer greater than 1, and a signal processor for processing read values to form the analog angle-modulated signal. An arrangement having a predominantly digital structure which does not utilize a DAC circuit as an interface between digital and analog sections of the signal processor is obtained in that the signal processor incorporates a zero-crossing generator comprising a delay circuit responsive to a numerical time-setting signal a set pulse having a presettable time delay of at most T/q, a gate circuit only responsive to a zero-crossing indication signal for transferring the set pulse to a bistable pulse generator, which produces a two-level signal whose level transitions only occur at the instants of the transferred setting pulses, and a bandpass filter having a centre frequency equal to the carrier frequency. These measures result in an arrangement which is capable of processing a wide range of data symbol rates 1/T and which is particularly suitable for monolithic integration.

8 Claims, 17 Drawing Figures

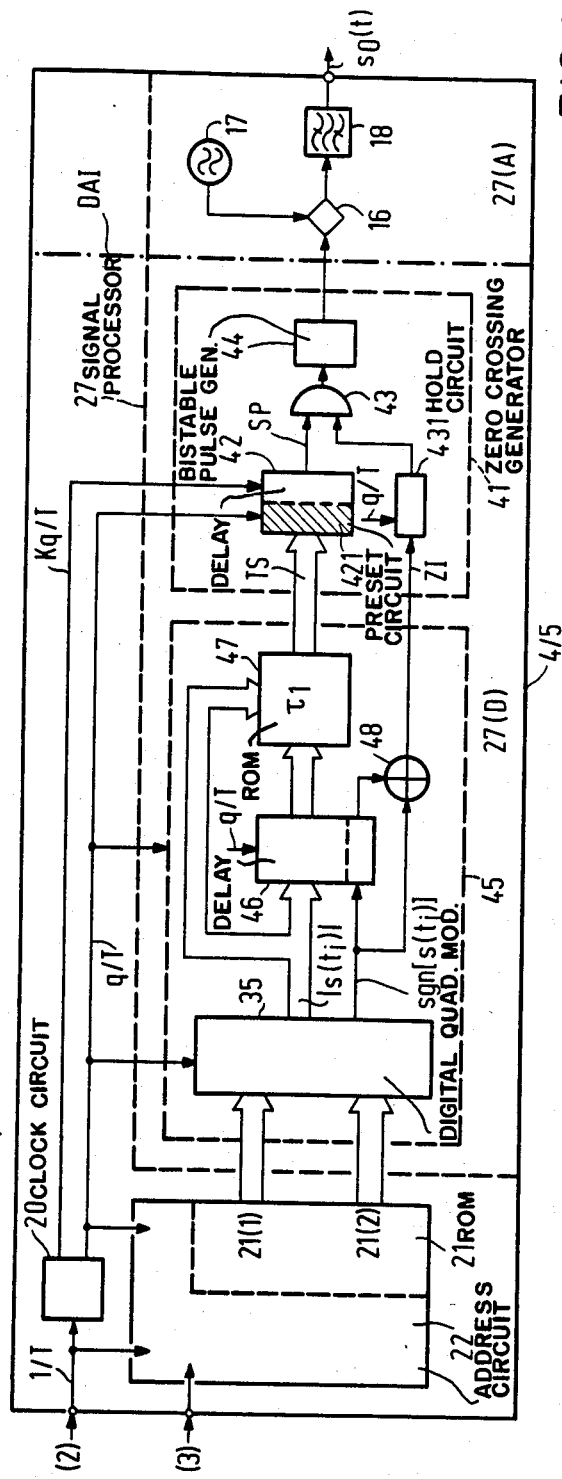
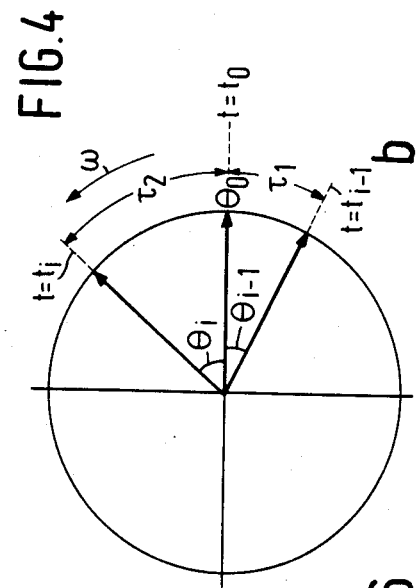
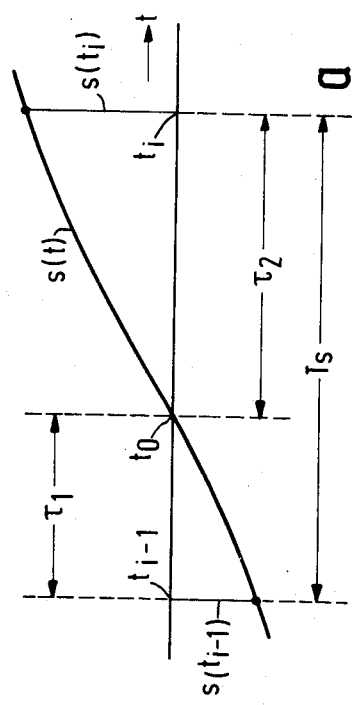
FIG.4
FIG.6

ARRANGEMENT FOR GENERATING AN ANGLE-MODULATED CARRIER SIGNAL OF CONSTANT AMPLITUDE IN RESPONSE TO DATA SIGNALS

BACKGROUND OF THE INVENTION

The invention relates to an arrangement for generating an analog angle-modulated carrier signal having a substantially constant amplitude in response to data signals of a given symbol frequency 1/T. The arrangement comprises a clock circuit synchronized with the symbol frequency 1/T for producing a first clock signal having a frequency q/T, where q is an integer greater than 1; a first read-only memory for storing in addressable locations digital numerical values representing modulation parameters of the angle-modulated carrier signal; an addressing circuit controlled by the first clock signal and responsive to a predetermined number of consecutive data symbols for producing addresses with a rate q/T for reading the stored values from the locations of the first read-only memory; and a signal processor connected to the first read-only memory processing the read values to form the analog angle-modulated carrier signal.

Such an arrangement is known from the article by De Jager and Dekker on TFM (Tamed Frequency Modulation) in IEEE Transactions on Communications, Vol. COM-26, No. 5, May 1978, pages 534–542 (see FIG. 15) and U.S. Pat. No. 4,229,821 (see FIG. 18). In these known arrangements, the values stored in the first read-only memory represent two modulation parameters cos $[\phi(t)]$ and sin $[\phi(t)]$, where $\phi(t)$ is the phase of the angle-modulated carrier signal which is determined by a filtered version of a predetermined number of consecutive data symbols. In the signal processor following this read-only memory, the analog signals corresponding with these two modulation parameters are obtained with the aid of the DAC-circuits (Digital-to-Analog Conversion circuits). The two analog signals are applied via two low-pass filters for suppressing unwanted signal components at the frequency q/T and multiples thereof to an analog quadrature modulation circuit, where they are multiplied by two carriers in phase quadrature by means of two product modulators and the angle-modulated carrier signal is obtained by means of an adder connected to the product modulators.

As the interface between the digital and analog signal processing sections are located immediately after the first read-only memory, this known arrangement has a pronounced hybrid structure and particularly high requirements are imposed on the circuit implementation of the analog section, both as regards the equality of the amplitude and the phase characteristics of the two signal paths and the unavoidable d.c. voltage off-sets occurring therein, and as regards the accuracy of the phase quadrature of the two carriers to prevent undesired amplitude and phase variations, undesired sidebands and insufficient carrier suppression from occurring in the angle-modulated carrier signal at the output of this arrangement.

A possible solution to the above-mentioned disadvantage is to replace the constituent parts of the analog quadrature modulation circuit (product modulators, carrier oscillator and adder) by their digital equivalents which are known per se, to arrange these equivalents for processing signal samples at the rate q/T of the first clock signal and to connect directly the digital quadrature modulation circuit thus obtained to the first read-only memory. The interface between the digital and analog sections is then shifted to the output of the quadrature modulation circuit and consequently only one DAC circuit is required for obtaining the analog angle-modulated carrier signal.

Although an arrangement is obtained which has a predominantly digital structure and which consequently is attractive for monolithic integration, it appears in practice that the requirement of a DAC-circuit as the interface between digital and analog sections generally limits the maximum data symbol rate 1/T allowable for the digital section. In addition, a high-speed DAC-circuit is not very suitable for monolithic integration and as a module it is proportionally more expensive than the digital integrated circuits for common logic functions.

SUMMARY OF THE INVENTION

The invention has for its object to provide an arrangement having a predominantly digital structure, which arrangement does not use a DAC circuit as an interface between the digital and analog signal processing sections and which thereby is capable of handling a wide range of data symbol frequencies and, in addition, is particularly suited for monolithic integration.

According to the invention, the arrangement provides for angle-modulated carrier signals whose total phase variation in a period T/q of the first clock signal is at most $\pi$ rad. A zero-crossing generator is incorporated in the signal processor, comprising; a delay circuit controlled by the first clock signal and responsive to a numerical time-setting signal for producing a set pulse having a presettable time delay of at most T/q relative to the first clock signal, said delay being determined by the time-setting signal; a gate circuit controlled by the first clock signal for transferring the set pulses produced by the delay circuit only in response to a zero-crossing indication signal; and a bistable pulse generator connected to the gate circuit for producing a two-level signal whose level transitions only occur at the instants of the set pulses transferred by the gate circuit to the pulse generator. This signal processor further comprising a bandpass filter coupled with the pulse generator and having a centre frequency corresponding with the carrier frequency of the analog angle-modulated carrier signal.

Although the invention originated from investigations in the field of a TFM transmitter for transmitting binary data signals and such a transmitter will be discussed in the sequel, the invention is not limited thereto as the same principles can be applied to data signals of a different kind and to a wide variety of modulation methods, such as n-PSK (n-ary Phase Shift Keying), n-PRCPM (n-ary Partial Response Continuous Phase Modulation) and CORPSK (Correlative PSK) described in the article by Aulin, Rydbeck and Sundberg and in the article by Muilwijk, respectively, in IEEE Transactions on Communications, Vol. COM-29, No. 3, March 1981, pages 210–225 and pages 226–236, respectively, and GMSK (Gaussian Minimum Shift Keying) described in the article by Murota and Hirade in IEEE Transactions on Communications, Vol. COM-29, No. 7, July 1981, pages 1044–1050.

SHORT DESCRIPTION OF THE DRAWINGS

Embodiments of the invention and their advantages will now be described in greater detail by way of example with reference to the accompanying drawings.

FIG. 1 shows a basic diagram of a TFM-transmitter as disclosed in U.S. Pat. No. 4,229,821;

FIG. 2 shows a block diagram of a practical embodiment of an arrangement for generating a TFM-signal suitable for use in the transmitter of FIG. 1 and also disclosed in U.S. Pat. No. 4,229,821;

FIG. 4 shows a block diagram of a first embodiment of an arrangement according to the invention for generating a TFM-signal;

DESCRIPTION OF THE EMBODIMENTS

General Description

Figure 1:
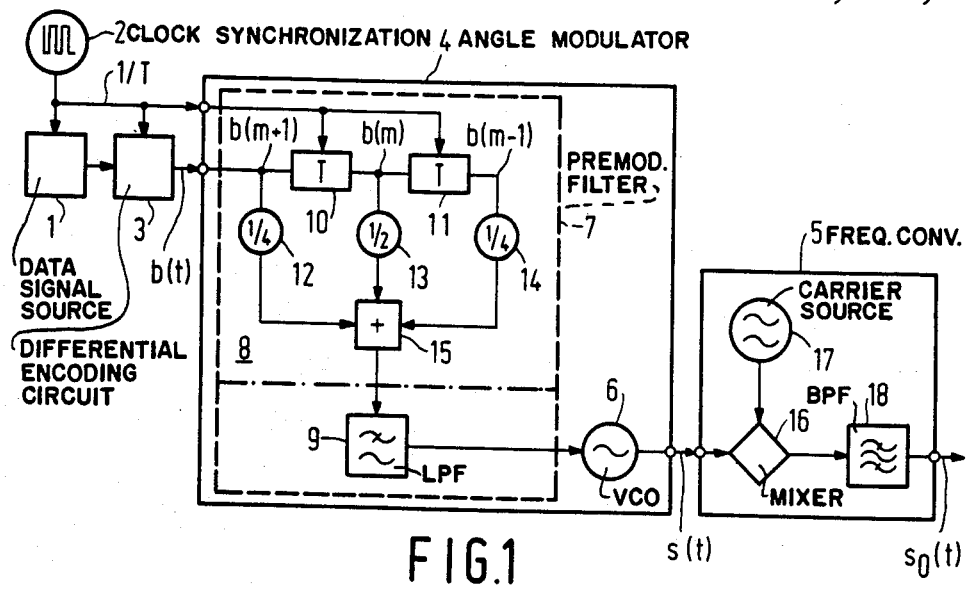

As the description of the arrangement for generating an angle-modulated carrier signal of a substantially constant amplitude is given for the case of a TFM-signal, a basic circuit diagram of a TFM-transmitter, as known from U.S. Pat. No. 4,229,821, will now be described with reference to FIG. 1.

This prior art transmitter comprises a data signal source 1 synchronized by a clock signal source 2. The binary data signals derived from source 1 at a symbol rate 1/T are applied through a differential encoding circuit 3 to an arrangement 4 for generating an angle-modulated carrier signal of a substantially constant amplitude and continuous phase. This modulated signal is applied to the transmission channel through an output circuit 5, in which both power amplification and also conversion to the frequency band of the transmission channel can be effected.

In FIG. 1, arrangement 4 is constituted by a frequency modulator with an ideal voltage-controlled oscillator 6, whose rest frequency is always equal to the desired (intermediate) carrier frequency $f_c$ and whose gain constant is always equal to $\pi/(2T)$ rad per volt per second, the differentially encoded binary data signals being applied to this oscillator 6 through a premodulation filter 7. This premodulation filter 7 comprises a partial-response-encoding circuit 8 and a low-pass filter 9, whose transfer function satisfies the third Nyquist criterion. Encoding circuit 8 is constituted in FIG. 1 by a transversal filter having two delay elements 10, 11, each producing a time delay equal to a symbol period T and each being connected to an adder 15 through three weighting circuits 12, 13, 14 having weighting factors equal to ¼, ½, ¼, respectively.

An angle-modulated carrier signal s(t) having a constant amplitude and a continuous phase $\phi(t)$ which can be expressed as:

$$s(t) = \sin[\omega_c t + \phi(t)] \quad (1)$$

where $\omega_c = 2\pi f_c$ and $f_c$ is the (intermediate) carrier frequency, is produced at the output of oscillator 6. In U.S. Pat. No. 4,229,821, it is demonstrated that between the phase $\phi(t)$ and the differentially encoded binary data signal b(t) applied to arrangement 4 there is such a relationship that the amount of the phase change over a symbol period T between the instants t=mT and t=mT+T, where m is an integer, is given by:

$$\phi(mT+T) - \phi(mT) = [b(m+1) + 2b(m) + b(m-1)]\pi/8 \quad (2)$$

where b(m) with b(m) = ±1 represents a symbol of data signal b(t) in symbol interval (mT, mT+T). In addition, it is demonstrated that the shape of the phase $\phi(t)$ for instants t within this symbol interval (mT, mT+T) depends on the specific choice of low-pass filter 9 satisfying the third Nyquist criterion, but that for each choice this shape is predominantly determined by the filtered version of the three successive data symbols b(m+1), b(m), b(m−1) included in formula (2), at the output of premodulation filter 7.

Figure 5:
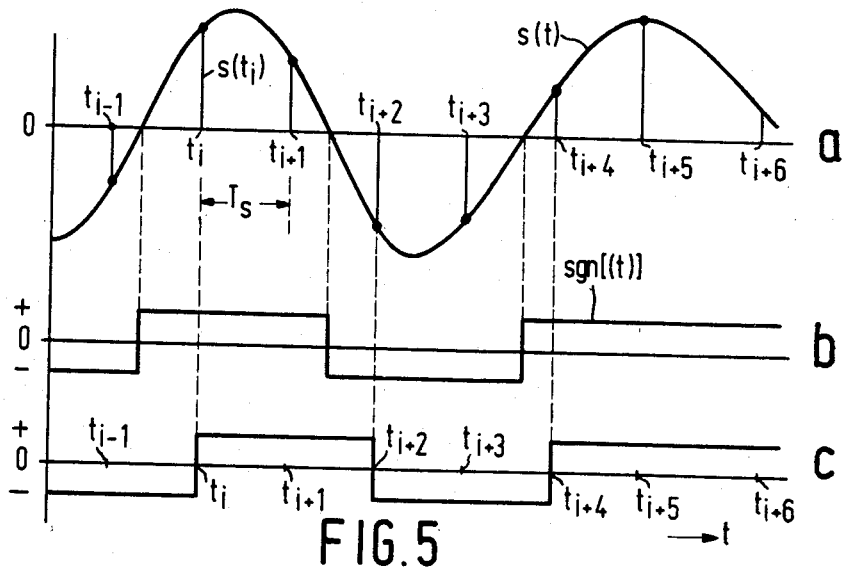
FIG. 5 shows some time diagrams and FIG. 6 a time diagram and a vector diagram to explain the operation of the arrangement shown in FIG. 4.

The TFM signal s(t) thus obtained has many properties desirable for efficient further processing in the practical embodiments of output circuit 5 such as they are used in radio-communication systems. In FIG. 1, this output circuit FIG. 5 is arranged as a frequency converter comprising a mixer stage 16, a carrier source 17 and a bandpass filter 18 for obtaining a TFM-signal $s_o(t)$ with a carrier frequency $f_o$ higher than the (intermediate) carrier frequency $f_c$, wherein $s_o(t)$ can be expressed as:

$$s_o(t) = \sin[\omega_o t + \phi(t)] \quad (3)$$

where $\omega_o = 2\pi f_o$. For that purpose source 17 produces a carrier signal of constant amplitude and frequency $f_o - f_c$ which is mixed with the TFM signal s(t) originating from oscillator 6 in mixer stage 16, whereafter the mixing product at the sum frequency $(f_o - f_c) + f_c = f_o$ is selected by means of bandpass filter 18. Since this TFM signal s(t) has a constant amplitude, no problems are encountered when in the practical embodiment of output circuit 5 use is made of components having a non-linear amplitude-transfer function for obtaining a high power efficiency. In addition, bandpass filter 18 need not satisfy special critical requirements for the selection of the signal to be applied to the transmission channel, as the TFM-signal s(t) has a compact power density spectrum with side lobes of relatively low levels.

In contrast therewith, in the practical embodiment of arrangement 4, very high requirements are imposed on the analog circuits (not shown in FIG. 1) required to maintain the rest frequency and the gain constant of oscillator 6 at their prescribed values of $f_c$ and $\pi/(2T)$.

Figure 2:
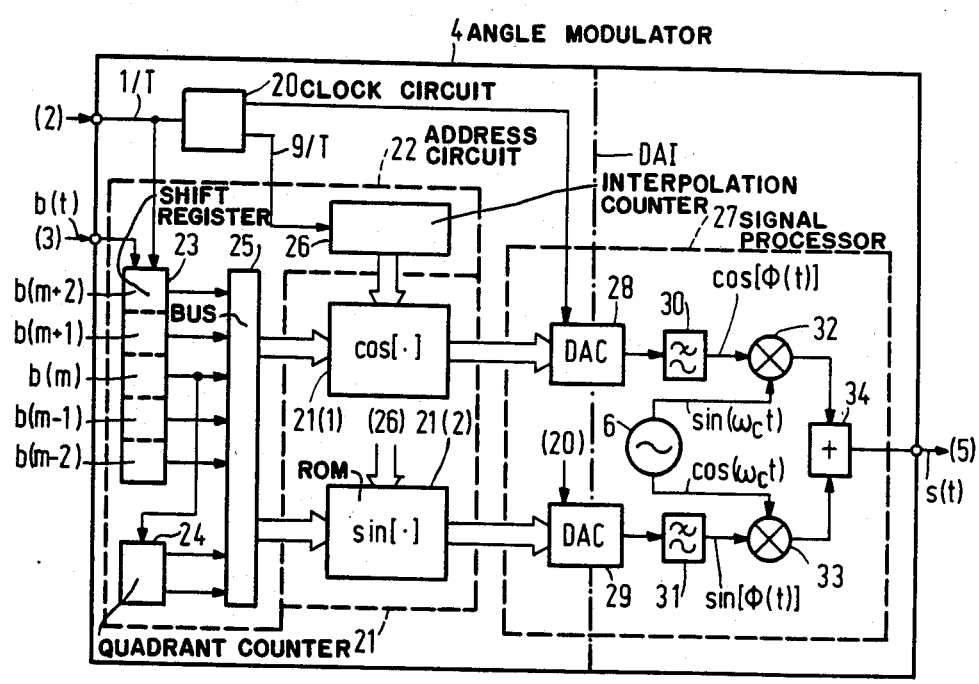

The concomitant problems can be circumvented by implementing arrangement 4 in the manner shown in FIG. 2, which is also known from U.S. Pat. No. 4,229,821. In this implementation, use is made of a quadrature modulation circuit for generating the TFM-signal s(t) and of digital signal processing techniques for realizing the premodulation filtering, in which only the most significant values of the desired impulse response g(t) of premodulation filter 7 in FIG. 1 are utilized, more specifically the values in a central interval of length pT, where p is a small odd number.

Arrangement 4 in FIG. 2 comprises a clock circuit 20, which is synchronized with the symbol rate 1/T of source 2 in FIG. 1 and produces a first clock signal having a frequency q/T, where q is an integer exceeding 1. In addition, arrangement 4 comprises a first read-only memory 21 having two memory sections 21(1) and 21(2), in the addressable locations of which digital numerical values are stored representing two modulation parameters cos [$\phi$(t)] and sin [$\phi$(t)], respectively, $\phi$(t) being the phase of the desired TFM signal s(t) as defined in formula (1). The addresses for reading the stored values from the locations of this first read-only memory 21 are produced by an addressing circuit 22. In addressing circuit 22, the differentially encoded binary data signal b(t) of encoding circuit 3 in FIG. 1 is applied to a shift register 23, whose contents are shifted at the symbol rate 1/T. This shift register 23 comprises a number of p elements, which number is equal to the number of symbol periods to which the length pT of the central interval of impulse response g(t) is restricted; in FIG. 2 the choice p=5 has been made. From formula (2) it follows that the phase $\phi$(t) between the instants t=mT and t=mT+T can change by not more than an amount of ±$\pi$/2 rad and that within this time interval the value modulo-2$\pi$ of the phase $\phi$(t) always remains in the same phase quadrant [y$\pi$/2, (y+1) $\pi$/2] with y=0, 1, 2 or 3, at an appropriate choice of $\phi$(t) at the reference instant t=0, whereas a possible transition to a different phase quadrant is only effected at the instant t=mT+T. For each phase quadrant the shape of the phase $\phi$(t) within the time interval (mT, mT+T) is then wholly determined by the impulse response g(t) limited to a length of tT and the values of the data symbols b(m−2), b(m−1), b(m), b(m+1), b(m+2) contained in shift register 23. However, the values of cos [$\phi$(t)] and sin [$\phi$(t)] still depend on the number y(m) modulo-4 which indicates in which phase quadrant phase $\phi$(t) is located for the relevant time interval. From formula (2) it can be derived that there exists a relationship in accordance with the following Table I between this number y(m), the number y(m−1) for the previous symbol period and the data symbols b(m−1) and b(m):

TABLE I

| b(m − 1) | b(m) | y(m) |
|---|---|---|
| +1 | +1 | y(m − 1) + 1 |
| +1 | −1 | y(m − 1) |
| −1 | +1 | y(m − 1) |
| −1 | −1 | y(m − 1) − 1 |

In FIG. 2 the output of the central element of shift register 23 is now connected to a quadrant counter 24 whose connecting position is the quadrant number y(m) modulo-4. This quadrant counter 24 is implemented as a modified modulo-4 up/down counter, whose counting position y(m) depends on the previous counting position y(m−1) and the data symbols b(m−1), b(m) in accordance with the above Table. The content of shift register 23 (5 bits) and the counting position of quadrant counter 24 (2 bits) form the first part of a read address which is applied to both sections 21(1) and 21(2) of read-only memory 21 via a bus circuit 25. These sections 21(1) and 21(2) contain, for each phase quadrant, the signal samples for cos [$\phi$(t)] and sin [$\phi$(t)], respectively, for the possible shapes of phase $\phi$(t) in one symbol period T. For a length pT of impulse response g(t) and thus a number of p elements of shift register 23, $2^p$ shapes of phase $\phi$(t) are possible in one symbol period T; in this case p=5 and consequently $2^p$=32. The two memory sections 21(1) and 21(2) are read with a sampling rate $f_s$ by means of an interpolation counter 26, which produces a read pulse in each counting position. For this sampling rate $f_s$ it holds that:

$$f_s = 1/T_s = q/T \tag{4}$$

where the interpolation factor q, the number of signal samples per symbol period T, is an integer and consequently interpolation counter 26 is constituted by a modulo-q counter whose counting input receives the first clock signal with a rate q/T from clock circuit 20 and whose counting position is applied to both sections 21(1) and 21(2) of read-only memory 21 as the second part of the read address. Further particulars about this prior art interpolation method can be found in references (9) and (10) of said U.S. Pat. No. 4,229,821.

A signal processor 27 is connected to read-only memory 21 for processing the read signal samples cos [$\phi$(mT)+n$T_s$+$T_s$/2] and sin [$\phi$(mT)+n$T_s$+$T_s$/2] where n=0, 1, 2, ..., (q−1) to form the analog TFM signal s(t). In signal processor 27 these signal samples are applied to respective DAC-circuits 28 and 29 which are controlled by clock circuit 20. To suppress unwanted signal components at the sampling rate $f_s$=q/T and multiples thereof, the two analog signals cos [$\phi$(t)] and sin [$\phi$(t)] are applied through two low-pass filters 30, 31 to a quadrature modulation circuit and multiplied therein by means of two product modulators 32, 33 by two phase-quadrature carriers originating from oscillator 6, more specifically by sin ($\omega_c$t) in modulator 32 and by cos ($\omega_c$t) in modulator 33. The output signals of these two product modulators 32, 33 are summed with the aid of an adder 34, resulting in a sum signal s(t) which is defined by:

$$s(t) = \cos[\phi(t)] \cdot \sin(\omega_c t) + \sin[\phi(t)] \cdot \cos(\omega_c t) \tag{5}$$

and which can be written as:

$$s(t) = \sin[\omega_c t + \phi(t)] \tag{6}$$

so that at the output of arrangement 4 the TFM signal is indeed obtained with the desired phase $\phi(t)$.

In the implementation shown in FIG. 2, use is indeed made of digital signal processing techniques, but the arrangement 4 still has a pronounced hybrid structure, as the interface between the digital and analog signal-processing sections is located near the input of signal processor 27. In FIG. 2 this interface is denoted by a dot-and-dashed line with label DAI (Digital-Analog-Interface). In FIG. 2 very severe requirements are therefore imposed on the control of the analog circuit functions, to prevent undesired amplitude and phase variations, undesired sidelobes and insufficient carrier suppression from occurring in the TFM-signal. These requirements relate more specifically to the equality of the amplitude and phase characteristics of the two signal paths (28, 30, 32, 34) and (29, 31, 33, 34) in signal processor 27 for the relevant frequency band, to the equality of the unavoidable d.c. voltage off-sets in these two signal paths and to the accuracy of the phase quadrature of the two carriers originating from oscillator 6. For low-pass filters 30, 31 these requirements imply that for the relevant frequency band the group delay times must be independent of the frequency and must be identical.

So as to make the practical implementation of filters 30, 31 not too complicated, interpolation factor q should be chosen to have an adequately high value, for example q=8 or q=16, for which choice a cut-off frequency for filters 30, 31 equal to half the sampling rate $f_s/2 = q/(2T)$ is acceptable.

Figure 3:
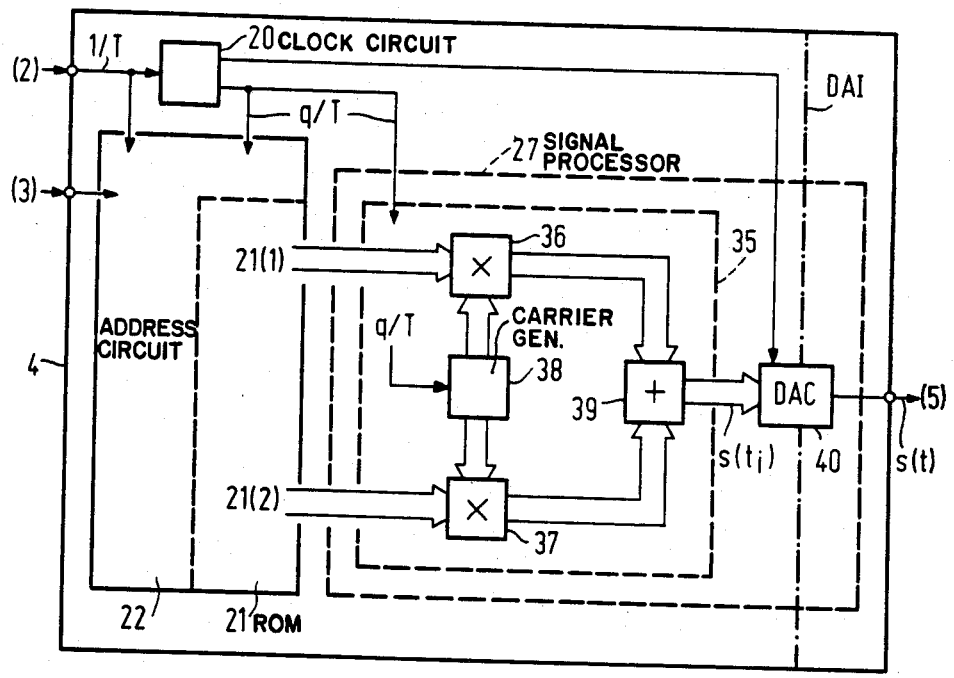
FIG. 3 shows a block diagram of a variant of the arrangement of FIG. 2 which utilizes a digital quadrature modulation circuit.

A possibility to obviate the problems caused by these requirements is illustrated by FIG. 3, which shows a variant of arrangements 4 of FIG. 2, corresponding components in both figures having been given the same reference numerals. FIG. 3 differs from FIG. 2 in that the component parts of the analog-quadrature modulation circuit of FIG. 2 (product modulators 32 and 33; carrier oscillator 6; adder 34) are replaced by their digital equivalents which are known per se. To that end signal processor 27 in FIG. 3 comprises a digital quadrature modulation circuit 35 which is directly connected to first read-only memory 21 and is arranged for processing discrete signal samples occurring at the rate q/T of the first clock signal. More specifically, the discrete signal samples cos $[\phi(t_i)]$ and sin $[\phi(t_i)]$ read from memory sections 21(1) and 21(2) are multiplied in digital multipliers 36 and 37 by the respective discrete carrier signal samples sin $(\omega_c t_i)$ and cos $(\omega_c t_i)$ originating from a digital carrier source 38, which is in synchronism with the first clock signal, the sampling instants $t_i$ satisfying the relation $t_i = iT_s + T_s/2$ where i is an integer. The digital output signals of multipliers 36, 37 are summed in a digital adder 39 producing a digital sum signal $s(t_i)$ which can be written as:

$$s(t_i) = \sin\,[\omega_c t_i + \phi(t_i)] \qquad (7)$$

and which is applied to a DAC-circuit 40 controlled by clock circuit 20 for producing the corresponding TFM-signal s(t). When the arrangement 4 of FIG. 3 is used in the TFM transmitter of FIG. 1, the functions of the two low-pass filters 30, 31 of FIG. 2 can be performed in a simple way by bandpass filter 18 in output circuit 5.

The implementation shown in FIG. 3 has the advantage that interface (DAI) between the digital and analog processing sections of signal processor 27 is not located near the input as in FIG. 2, but has been shifted to the output of digital quadrature modulation circuit 35 and consequently only one DAC circuit 40 is required to obtain the analog TFM signal s(t).

In spite of the predominantly digital structure of arrangement 4 in FIG. 3, it has been found in practice that the requirement that a DAC circuit 40 must be provided in interface DAI is an obstacle for monolithic integration of arrangement 4 in its totality, more specifically for higher values of the data symbol rate 1/T, since a high-speed DAC-circuit is not very suitable for monolithic integration and as module is proportionally more expensive than the digital integrated circuits for normal logic functions.

Description of the Embodiment of FIG. 4

FIG. 4 shows a block diagram of an arrangement 4/5 according to the invention which performs the combined functions of arrangement 4 in FIG. 3 and output circuit 5 in FIG. 1, has a predominantly digital structure but does not make use of a DAC-circuit as an interface DAI between the digital and analog signal processing sections of signal processor 27, these sections being denoted in FIG. 4 by the respective references 27(D) and 27(A). In addition, components in FIG. 4 corresponding to those in FIG. 1 and FIG. 3 are given the same reference numerals.

A zero-crossing generator 41 is incorporated in the digital section 27(D) of signal processor 27 in FIG. 4. This generator 41 comprises a delay circuit 42 which is controlled by the first clock signal having frequency q/T in order to produce in response to a numerical time-setting signal TS a set pulse SP which is delayed by $\tau_1 \leq T/q$ relative to this first clock signal, the magnitude of which delay is determined by the time-setting signal TS. In addition, generator 41 comprises a gate circuit 43 which is also controlled by this first clock signal to transfer the set pulses SP produced by delay circuit 42 only in response to a zero-crossing indication signal ZI, and a bistable pulse generator 44 connected to gate circuit 43 for producing a two-level signal, the level-transitions of which only occur at the instants of the set pulses SP transferred by gate circuit 43 to pulse generator 44. Analog section 27(A) of signal processor 27 comprises a bandpass filter coupled to pulse generator 44, the centre frequency of which filter corresponds to the carrier frequency $f_o$ of the analog TFM-signal $s_o(t)$. If this carrier frequency $f_o$ differs from the (intermediate) carrier frequency $f_c$ used in the digital section 27(D), analog section 27(A) is arranged as a frequency converter and is of the same structure as output circuit 5 in FIG. 1; if the two carrier frequencies $f_o$ and $f_c$ are equal, then mixer stage 16 and carrier source 17 are omitted in FIG. 4 and pulse generator 44 is connected directly to bandpass filter 18.

The two signals TS and ZI for the control of zero-crossing generator 41 are obtained in FIG. 4 with the aid of a control generator 45 comprising a digital quadrature modulation circuit 35 which, as in FIG. 3, is directly connected to first read-only memory 21. In this case, the signals TS and ZI are derived from the digital signal that is available at the output of quadrature modulation circuit 35 and corresponds to samples $s(t_i)$ of the analog TFM-signal s(t) occurring at a sampling rate $1/T_s = q/T$. In FIG. 4 it is assumed that the output signal of circuit 35 is available in sign-and-magnitude representation. The bits representing the magnitude $|s(t_i)|$ of the sample $s(t_i)$ and the bits representing the magnitude $|s(t_{i-1})|$ of the preceding sample $s(t_{i-1})$, which last-mentioned bits are obtained with the aid of a delay circuit 46 producing a time delay equal to one period T/q of the first clock signal, form together the address for a second read-only memory 47. Digital numerical values which are representative of the time delay $\tau_1$ of set pulse SP relative to the pulse of the first clock signal at instant $t_i$, which delay is to be set in zero-crossing generator 41, are stored in the addressable locations of read-only memory 47. The numerical values read from memory 47 at a rate q/T form the time-setting signal TS. The bit representing the sign sgn[s($t_i$)] of the sample s($t_i$) and the bit representing the sign sgn[s($t_{i-1}$)] of the preceding sample s($t_{i-1}$), which last-mentioned bit is also obtained with the aid of delay circuit 46, are both applied to a sign detector 48 whose output signal assumes the logic value "1" in the event of unequal sign bits. This output signal of sign detector 48 constitutes the zero-crossing indication signal ZI for zero-crossing generator 41 in the period of the first clock signal subsequent to instant $t_i$.

Operation and further details of signal processor 27 of FIG. 4 will now be described with reference to the diagrams shown in FIGS. 5 and 6.

Time diagram a in FIG. 5 is a graphic representation of an analog TFM-signal s(t) of the shape:

$$s(t)=\sin\ [\omega_c t+\phi(t)] \tag{8}$$

and of its discrete signal samples s($t_{i-1}$), s($t_i$), s($t_{i+1}$), ... which occur at a rate $1/T_s = q/T$ and are obtained in FIG. 3 by applying the corresponding binary numbers at the output of digital quadrature modulation circuit 35 to DAC-circuit 40.

However, such a complete digital-to-analog conversion with the aid of a DAC-circuit is not used in FIG. 4, but a two-level signal whose zero-crossings correspond to the zero crossings of the analog TFM signal s(t) as defined in formula (8) is derived from the binary numbers at the output of digital quadrature modulation circuit 35. Time diagram b in FIG. 5 is a graphic representation of the two-level signal which corresponds to signal s(t) in diagram a and can be expressed by $$\text{sgn}[s(t)] = \text{sgn}\{\ \sin\ [\omega_c t+\phi(t)]\} \tag{9}$$

Since the analog TFM signal s(t) defined by formula (8) is an angle-modulated signal of constant amplitude, the zero-crossings of signal s(t) and consequently also the zero-crossings of two-level signal sgn[s(t)] as defined in formula (9), contain all the essential information of signal s(t). As a result thereof, the desired analog TFM signal s(t) can be derived from the two-level signal sgn[s(t)] of formula (9), as can be illustrated by writing said last signal as:

$$\begin{aligned}\text{sgn}[s(t)] &= \text{sgn}\{\sin[\omega_c t + \phi(t)]\} \\ &= C_1\{\sin[\omega_c t + \phi(t)] + (1/3)\sin\ 3[\omega_c t + \phi(t)] + \\ &\qquad (1/5)\sin\ 5[\omega_c t + \phi(t)] + \ldots\}\end{aligned} \tag{10}$$

where $C_1$ is a constant having a value $C_1 = 4/\pi$. If now the information-conveying time-varying phase $\phi(t)$ is an appropriately band-limited signal and if furthermore the carrier frequency $\omega_c = 2\pi f_c$ has been chosen appropriately so that no special overlap of the fundamental and the third harmonic components in the right-hand member of formula (10) occurs, then the desired fundamental term sin [$\omega_c t+\phi(t)$] can be obtained by applying the two-level signal sgn[s(t)] defined in formulae (9) and (10) to a bandpass filter having a centre frequency equal to the carrier frequency $\omega_c$ and an appropriate bandwidth.

In this way a digital-to-analog conversion with the aid of a DAC circuit is replaced in signal processor 27 of FIG. 4 by a sign operation on the binary output numbers of modulation circuit 35 representing signal samples s($t_i$) of TFM signal s(t). To obtain a two-level signal whose zero-crossings correspond sufficiently accurately to the zero-crossings of TFM-signal s(t), it is however not sufficient to use the sign bit of these binary output numbers as will be apparent from time diagram c in FIG. 5, which is a graphic representation of a two-level signal obtained by retaining the sign bit associated with the samples s($t_{i-1}$) s($t_i$), s($t_{i+1}$), ... in diagram a, during one sampling period $T_s = T/q$. FIG. 5 also shows that this insufficient accuracy in the determination of the zero-crossings of TFM signal s(t) is the result of the proportionally long duration $T_s$ of the time interval between adjacent samples s($t_i$), s($t_{i+1}$).

The fact that the binary output numbers of modulation circuit 35 represent signal samples s($t_i$) satisfying the relationship given in formula (7):

$$s(t_i) = \sin\ [\omega_c t_i + \phi(t_i)] \tag{11}$$

is now utilized in signal processor 27 of FIG. 4 to determine the zero-crossings of TFM signal s(t) more accurately with the aid of sinusoidal interpolation between two adjacent samples. As such a zero-crossing only occurs between a pair of adjacent samples of opposite polarities, for example the pair s($t_{i-1}$), s($t_i$) in diagram a of FIG. 5, this interpolation needs only to be used if the sign bits associated with this pair of samples are unequal that is to say if sign detector 48 indicates a change in sign between adjacent samples by means of a signal ZI of logic value "1". This sinusoidal interpolation will now be described in greater detail with reference to FIG. 6.

Time diagram a in FIG. 6 is a representation on an enlarged scale of the time interval ($t_{i-1}$, $t_i$) in diagram a of FIG. 5, in which a zero-crossing of TFM signal s(t) occurs at an instant $t = t_o$. Vector diagram b in FIG. 6 is a polar representation of the path of the constant-amplitude signal vector associated with the TFM signal s(t) in time diagram a of FIG. 6.

If the angle $\theta(t)$ is introduced by writing TFM signal s(t) as:

$$s(t) = \sin\ [\omega_c t + \phi(t)] = \sin\ \theta(t) \tag{12}$$

and the values of angle $\theta(t)$ at the instants $t = t_{i-1}$, $t_o$, $t_i$ are written as $\theta_{i-1}$, $\theta_o$, $\theta_i$ then the time delay $\tau_1$ of the zero-crossing at instant $t = t_o$ relative to sampling instant $t = t_{i-1}$ in time diagram a of FIG. 6 can be derived in a very good approximation from vector diagram b by assuming that the angular frequency $\omega = d\theta/dt$ of TFM-signal s(t) is constant during the time interval ($t_{i-1}$, $t_i$) having a duration of one sampling period $T_s$. This implies that the signal vector in diagram b of FIG. 6 passes through the arc of circle ($\theta_{i-1}$, $\theta_i$) with a constant angular speed $\omega$ and consequently that the angle $\theta_o$ is given by:

$$\theta_o = \theta_{i-1} + (\theta_i - \theta_{i-1})\tau_1/T_s \tag{13}$$

Since a zero-crossing occurs when $$s(t)=\sin \theta(t)=\sin \theta_o=0 \tag{14}$$

thus when $$\theta_o=0, \pm\pi, \pm 2\pi, \ldots \tag{15}$$

and the value $\theta_o=0$ may be chosen without any loss in generality, the following relation for time delay $\tau_1$ can be derived from formula (13):

$$\tau_1 = -\theta_{i-1}T_s/(\theta_i - \theta_{i-1}) \tag{16}$$

Vector $\theta_{i-1}$ and $\theta_i$ have opposite signs and are limited in magnitude to values between 0 rad and $\pi$ rad, formula (16) can be generalized to $$\tau_1 = |\theta_{i-1}|T_s/(|\theta_i| + |\theta_{i-1}|) \tag{17}$$

A similar relation can be derived for the advance $\tau_2$ of the zero crossing at instant $t=t_o$ relative to sampling instant $t=t_i$ in time diagram a of FIG. 6:

$$\tau_2 = T_s - \tau_1 = |\theta_i|T_s/(|\theta_i| + |\theta_{i-1}|) \tag{18}$$

In principle each of these two formulae (17) and (18) can be used for the determination of time delay $\tau_1$.

If however the values of the angles $\theta_{i-1}$ and $\theta_i$ are allowed to vary between 0 rad and $\pi$ rad, it is not possible to unambiguously derive the values $\theta_{i-1}$ and $\theta_i$ from only the values $\sin \theta_{i-1}=s(t_{i-1})$ and $\sin \theta_i=s(t_i)$, because for $0 \leq \theta \leq \pi$ the relation $\sin \theta = \sin (\pi-\theta)$ holds. So as to be able to determine in this case a unique value $\theta_i$, additional information about $\omega_c$, $T_s$ and $\phi(t_i)$ must be provided in view of the relation following from formula (12):

$$\theta_i = \omega_c t_i + \phi(t_i) \tag{19}$$

where:

$$t_i = iT_s + T_s/2 \tag{20}$$

In the method used in FIG. 4 for generating the discrete signal samples $s(t_i)=\sin \theta_i$, the quantities $\phi(t_i)$, $\omega_c$ and $T_s$ are explicitly related to the differentially encoded binary data signal b(t) of encoding circuit 3 in FIG. 1. As will also be apparent from vector diagram b in FIG. 6, the above ambiguity can be prevented by imposing the further constraint on the angles $\theta_{i-1}$ and $\theta_i$ that they must be situated in adjacent phase quadrants. This constraint implies the condition that $$|\theta_i - \theta_{i-1}| \leq \pi \tag{21}$$

that is to say that the total phase variation of the angle-modulated signal $s(t)=\sin[\omega_c t + \phi(t)]$ within the time interval $(t_{i-1}, t_i)$ of the length of one sampling period $T_s=T/q$ shall be at most $\pi$ rad. On the basis of formulae (19) and (20) the condition of formula (21) can be written as:

$$|\omega_c T_s + \phi(t_i) - \phi(t_{i-1})| \leq \pi \tag{22}$$

For the TFM-signal s(t) the phase $\phi(t)$ in one data symbol period of duration T does not change by more than an amount of $\pm\pi/2$ rad, cf. formula (2), so that by choosing $\omega_c T_s$ to be equal to $\pi/2$, that is to say a sampling period $f_s=1/T_s$ equal to four times the carrier frequency $f_c$, the condition of formula (22) can be satisfied, irrespective of the value of the integer q, that is to say irrespective of the number of signal samples per data symbol period T.

Observing the condition of formula (22) for the total phase variation of TFM signal s(t) within one sampling period $T_s$ use is now made of formula (17) for determining the numerical values to be stored in second read-only memory 47 of control generator 45 in FIG. 4 and which are representative of the delay $\tau_1$ of the zero-crossing at instant $t=t_o$ relative to sampling instant $t=t_{i-1}$. With a view to the digital implementation of control generator 45, the sampling period $T_s$ is divided into K sub-periods each having a size $\tau_o$ so that:

$$\tau_o = T_s/K = T/Kq \tag{23}$$

K being chosen such that:

$$K = 2^k \tag{24}$$

where k is an integer. This sub-period $\tau_o$ constitutes the quantization unit for time delay $\tau_1$ and from formula (17) it then follows that a k-bit binary number which is representative of:

$$\tau_1/\tau_o = K|\theta_{i-1}|/(|\theta_i| + |\theta_{i-1}|) \tag{25}$$

must be stored in second read-only memory 47 in the location for the pair $|\theta_{i-1}|$, $|\theta_i|$, for which as described in the foregoing, the address is formed unambiguously by the bits representing $\sin|\theta_{i-1}| = |s(t_{i-1})|$ and $|\sin \theta_i| = |s(t_i)|$.

In this case delay circuit 42 in zero-crossing generator 41 of FIG. 4 is constituted by a presettable k-bit down-counter which receives at its counting input a second clock signal having a frequency Kq/T and being produced by clock circuit 20 and which supplies an output pulse when its zero position is reached. This down-counter 42 comprises a presetting circuit 421 which is controlled by the first clock signal having a frequency q/T for setting down-counter 42 to a counting position corresponding to the k-bit binary number which is read as a time-setting signal TS from second read-only memory 47 at sampling instant $t=t_i$ and is representative of a delay $\tau_1$ of the zero crossing of TFM signal s(t) relative to the preceding sampling instant $t=t_{i-1}$. The pre-setting operation at instant $t=t_i$ has for its result that at instant $t=t_i+\tau_1$ down-counter 42 supplies an output pulse which is applied as set pulse SP to an input of gate circuit 43 constituted by an AND-gate. This set pulse SP occurs in each sampling period, but may only be transferred by AND-gate 43 at a real zero-crossing of TFM-signal s(t). When sign detector 48 in FIG. 4 is constituted by an Exclusive-OR-gate, then the bit of zero-crossing indication signal ZI at sampling instant $t=t_i$ is only a logic "1" bit in the event of a real zero-crossing of TFM-signal s(t) between the sampling instants $t=t_{i-1}$ and $t=t_i$, and consequently a logic "0" bit in the opposite case. Since the bit of signal ZI occurs at sampling instant $t=t_i$ and a set pulse SP can occur during the entire sampling period after this instant $t=t_i$, signal ZI of Exclusive-OR-gate 48 is applied to a hold circuit 431 in the form of a D flip-flop which is controlled by the first clock signal at a rate q/T and whose output (Q) is connected to the other input of AND-gate 43. During a sampling period starting at sampling instant $t=t_i$ AND-gate 43 only transfers a set pulse SP if at this sampling instant $t=t_i$ a logic "1" bit of signal ZI occurs. When bistable pulse generator 44 is constituted by a D flip-flop whose inverse output ($\overline{Q}$) is fed-back to the signal input (D) then applying the set pulses SP transferred by AND-gate 43 to the clock input (C) of D flip-flop 44 results in a two-level signal at the output (Q), whose level transitions only occur at the instants of the set pulses SP which were passed by AND-gate 43. Apart from a constant delay of one sampling period $T_s$, which is of no importance for the further signal processing, the zero-crossings of this two-level signal of D flip-flop 44 corresponds in a very good approximation to the zero-crossings of the desired TFM-signal s(t) and consequently this two level signal may be written as sgn[s(t)]. From the explanation of formula (10) it then follows that the desired TFM-signal s(t) can be obtained by applying this two-level signal of D flip-flop 44 directly to bandpass filter 18 in analog section 27(A) of signal processor 27, the centre frequency of filter 18 being equal to the carrier frequency $f_c$ and the bandwidth having been chosen such that the desired TFM signal s(t) can be separated from the third and higher harmonic components contained in this two-level signal without introducing excessive intersymbol interference in the output signal $s_o(t)$ of filter 18. In this case the two TFM signals s(t) and $s_o(t)$ both have the same carrier frequencies $f_c=f_o$. For the case of unequal carrier frequencies $f_o$ and $f_c$ illustrated in FIG. 4, this two-level signal of D flip-flop 44 is first subjected to frequency conversion with the aid of mixer stage 16 and carrier source 17 and applied thereafter to bandpass filter 18, whose centre frequency is then equal to the carrier frequency $f_o$ of the ultimate TFM signal $s_o(t)$.

Thanks to the fact that there is no DAC-circuit as an interface DAI to the analog section 27(A) of signal processor 27, the digital signal-processing section of arrangement 4/5 in FIG. 4 is capable of processing a wide range of data symbol rates 1/T and is yet particularly suitable for a comparatively low-cost monolithic integration, whilst in addition the circuit implementation of analog section 27(A) itself need not to satisfy particularly high requirements because only analog signals of a constant amplitude are processed.

Although arrangement 4/5 of FIG. 4 is described for the case of a TFM transmitter for the transmission of binary data signals, a skilled art worker in the field of modulation—after having read the explanation given with reference to FIGS. 5 and 6—will understand that the procedure of generating an angle-modulated carrier signal used in FIG. 4 can be applied generally to data signals of a different kind and to a wide variety of modulation methods, such as n-PSK, n-PRCPM and CORPSK, provided the conditions of formulae (21) and (22) are always satisfied, that is to say provided the total phase variation of the angle-modulated carrier signal within one sampling period $T_s$ is at most $\pi$ rad.

Variants of the Embodiment of FIG. 4

The arrangement 4/5 of FIG. 4 is suitable for very general use, but requires a comparatively large capacity of the second read-only memory 47. As will be apparent from the foregoing description with reference to the formulae (23)–(25), a k-bit binary number representative of the quantized time delay $\tau_1 \leq T_s$ is stored in the location for the pair $|\theta_{i-1}|$, $|\theta_i|$ for which the address is formed by the bits representing $$|\sin\theta_{i-1}| = |s(t_{i-1})| \text{ and } |\sin\theta_i| = |s(t_i)|$$

When $|s(t_{i-1})|$ and $|s(t_i)|$ are each represented with 7 bits and the sampling period $T_s$ is subdivided into K=32 subperiods $\tau_o$ so that k=5, then read-only memory 47 must have a capacity of $5\times 2^{14}$ bits.

A possibility to reduce this capacity will now be described with reference to FIG. 7, which shows a variant of control generator 45 in FIG. 4, corresponding elements in these two Figures having been given the same reference numerals.

Figure 7:
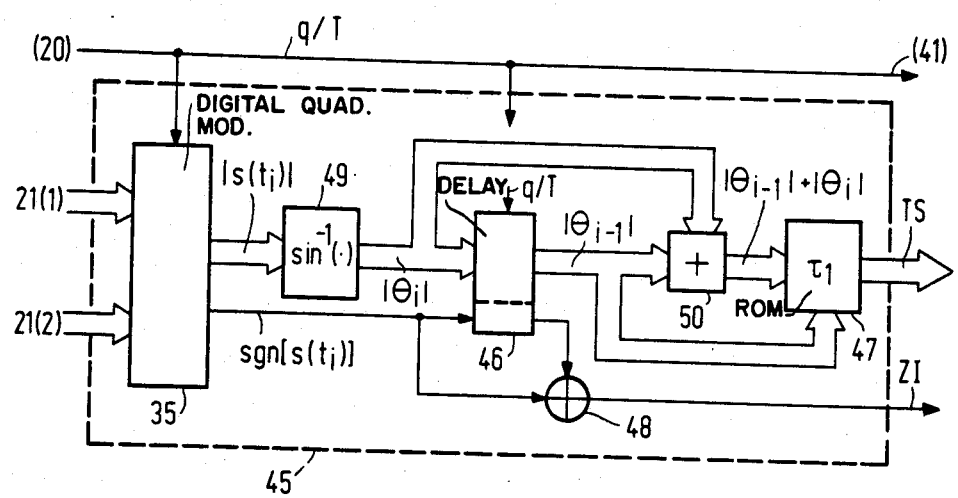
FIGS. 7 and 8 shows variants of the control generator used in the arrangement of FIG. 4.

The first difference between FIG. 7 and FIG. 4 is that FIG. 7 utilizes a digital quadrature modulation circuit 35 in which the carrier signals have in addition to a carrier frequency of the above-mentioned value $f_c=f_s/4$ also an additional phase shift of $-\pi/4$ rad. Multiplying the discrete signal samples $\cos[\phi(t_i)]$ and $\sin[\phi(t_i)]$ read from the memory sections 21(1) and 21(2) by the discrete carrier signal samples $\sin(\omega_c t_i \pi/4)$ and $\cos(\omega_c t_i - \pi/4)$ then results in a digital sum signal:

$$s(t_i) = \sin[\omega_c t_i - \pi/4 + \phi(t_i)] \tag{26}$$

which because of the relations:

$$t_i = iT_s + T_s/2 \tag{27}$$

$$1/T_s = f_s = 4f_c$$

can be written as:

$$s(t_i) = \sin\theta_i = \sin[i\pi/2 + \phi(t_i)] \tag{28}$$

Furthermore, FIG. 7 differs from FIG. 4 in that control generator 45 makes a more direct use of formula (25) for the quantized time delay $\tau_1$. In FIG. 7 a conversion circuit 49 of the arcsin-type is connected to the output of modulation circuit 35 for converting the magnitude $|s(t_i)| = |\sin\theta_i|$ of the signal samples $s(t_i)$ into the magnitude $|\theta_i|$ of the corresponding angles $\theta_i$. FIG. 7 also comprises an adder for forming the sum $|\theta_{i-1}| + |\theta_i|$ present in the denominator of the right-hand member of formula (25). The address for read-only memory 47 is formed by the bits representing $|\theta_{i-1}|$ and the sum $|\theta_{i-1}| + |\theta_i|$.

The reduction in the capacity of read-only memory 47 is based on the choice of carrier signals in modulation circuit 35. When the phase $\phi(t)$ at the instant $t=t_i$ is written as $\phi_i$, then on the basis of formula (28) the following Table can be composed for the values of the output signal s(t) of modulation circuit 35 and the corresponding values of the angle $\theta(t)$ in the interval $(-\pi, \pi)$ at consecutive instants $t_{i-1}, t_i, t_{i+1}, \ldots$.

TABLE II

| t | s(t) = sin θ(t) | θ(t) |
|---|---|---|
| $t_{i-1}$ | $\sin\phi_{i-1}$ | $\phi_{i-1}$ |
| $t_i$ | $\cos\phi_i$ | $\pi/2 + \phi_o$ |
| $t_{i+1}$ | $-\sin\phi_{i+1}$ | $-\phi_{i+1}$ |
| $t_{i+2}$ | $-\cos\phi_{i+2}$ | $-\pi/2 - \phi_{i+2}$ |
| $t_{i+3}$ | $\sin\phi_{i+3}$ | $\phi_{i+3}$ |
| $t_{i+4}$ | $\cos\phi_{i+4}$ | $\pi/2 + \phi_{i+4}$ |
| $t_{i+5}$ | $-\sin\phi_{i+5}$ | $-\phi_{i+5}$ |
| $t_{i+6}$ | $-\cos\phi_{i+6}$ | $-\pi/2 - \phi_{i+6}$ |

As has already been mentioned in the foregoing, the phase $\phi(t)$ of a TFM-signal s(t) changes in one data symbol period T by not more than an amount of $\pi/2$ rad, compare formula (2), so that in one sampling period $T_s=T/q$ the phase $\phi(t)$ changes by not more than an amount of $\pi/(2q)$ rad and consequently it holds for random integers i that:

$$\max|\theta_i-\theta_{i-1}| \leq \pi/(2q) \tag{29}$$

From this the relation $$(1-1/q)\pi/2 \leq |\theta_{i-1}|+|\theta_i| \leq (1+1/q)\pi/2 \tag{30}$$

results for the sum $|\theta_{i-1}|+|\theta_i|$. This sum $|\theta_{i-1}|+|\theta_i|$ thus varies in a range of $\pi/q$ rad which is centred at the value $\pi/2$ rad and, at the above-mentioned values of the interpolation factor $q=8$ or $q=16$, is much smaller than the range of $|\theta_{i-1}|$ or $|\theta_i|$ as each of these angles can vary between 0 and $\pi/2$ rad. If now in FIG. 7 the value within this last-mentioned range is again represented by a 7-bit binary number, then with an interpolation factor $q=8$ the value of the sum $|\theta_{i-1}|+|\theta_i|$ can be represented with the same degree of accuracy by a 5-bit binary number. Using the same sub-division of sample period $T_s$ into $K=32$ subperiods $\tau_o$ as in FIG. 4, so with $k=5$, read-only memory 47 in FIG. 7 must only have a capacity of $5\times 2^{12}$ bits, which means a reduction by a factor of 4 compared with FIG. 4. Generally, this reduction factor is $q/2$ at interpolation factors q equal to integral powers of 2.

In the described example, the range of $\pi/8$ rad for the sum $|\theta_{i-1}|+|\theta_i|$ may alternatively be subdivided to a lesser degree, for example into $8=2^3$ subranges instead of into $32=2^5$ sub-ranges. The maximum error introduced thereby in the determination of the quantized time delay $\tau_1$ defined in formula (25) is less than 2%. This small error is, however, accompanied by a considerable additional reduction of the capacity of read-only memory 47 as the value of the sum $|\theta_{i-1}|+|\theta_i|$ can then be represented with a binary number of only 3 bits and consequently read-only memory 47 need only have a capacity of $5\times 2^{10}$ bits.

Figure 8:
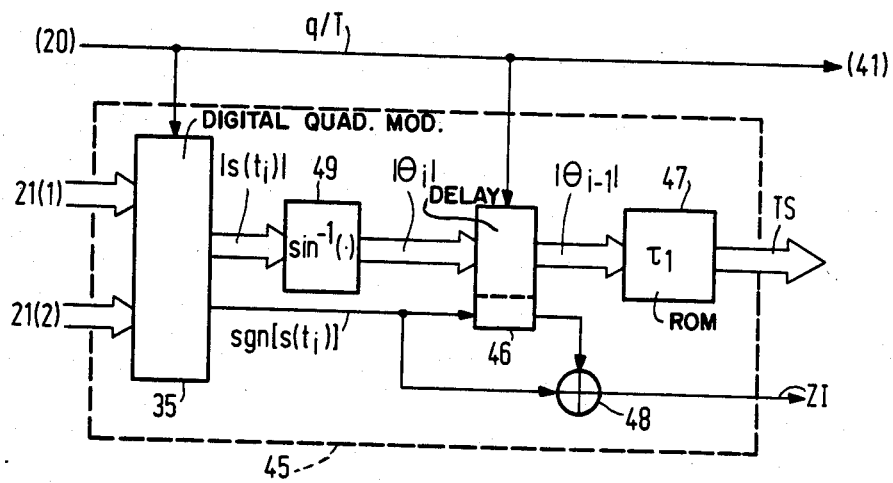

If now furthermore the interpolation factor q is increased from $q=8$ to, for example, $q=16$ or $q=32$, the sum $|\theta_{i-1}|+|\theta_i|$ can be set equal to $\pi/2$ rad and the quantized time delay $\tau_1$ can be determined in a good approximation by the relation:

$$\tau_1 = 2K\tau_o|\theta_{i-1}|/\pi \tag{31}$$

derived from formula (25). The maximum error then introduced by the determination of $\tau_1$ in accordance with formula (31) instead of in accordance with formula (25) amounts to only some percents for said values $q=16$ or $q=32$. From formula (31), it follows however that the structure of control generator 35 of FIG. 7 can be simplified to that of the control generator 45 shown in FIG. 8, which differs from FIG. 7 in that adder 50 is missing and the address for read-only memory 47 is formed by the bits representing $|\theta_{i-1}|$. If now for said last representation a 7-bit binary number is again used, then read-only memory 47 in FIG. 8 need only have a capacity of $5\times 2^7$ bits.

From the above it will be apparent that a tradeoff between the accuracy of the determination of $\tau_1$ and the capacity of read-only memory 47 is possible.

Figure 9:
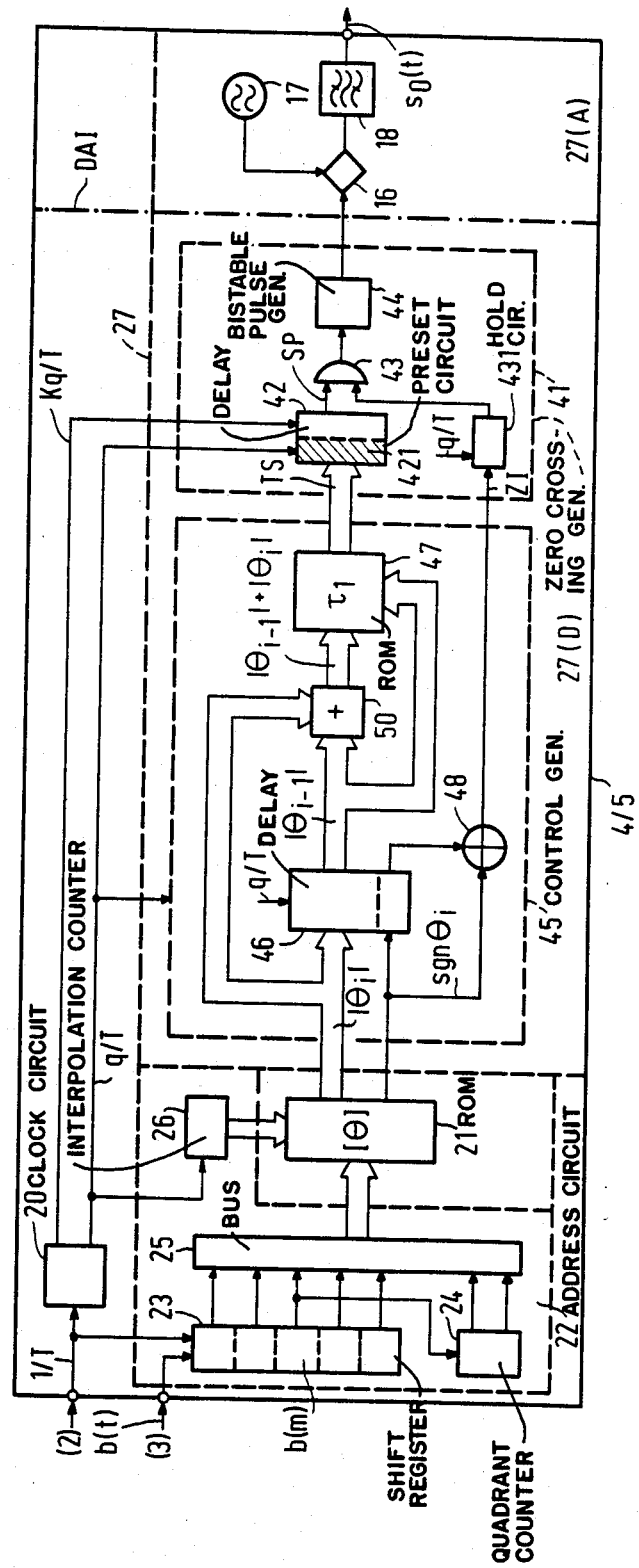
FIG. 9 shows a block diagram of a second embodiment of an arrangement according to the invention for generating a TFM-signal.

Description of the Embodiment of FIG. 9

FIG. 9 shows a block diagram of an arrangement 4/5 in accordance with the invention which in many respects may be considered as a variant of the arrangement 4/5 in FIG. 4 when the control generator 45 shown in FIG. 7 is used therein. Corresponding elements in FIG. 4, FIG. 7 and FIG. 9 are therefore given the same reference numerals.

The essential difference between FIG. 4 and FIG. 9 resides in the signals from which the two signals TS and ZI for the control of the zero-crossing generator 41 are derived.

As regards FIG. 4 and its variant described so far, the two control signals TS and ZI are derived from the samples $s(t_i)$ of the analog TFM signal $s(t_i)$ at the instants $t_i=iT_s+T_s/2$. To obtain the digital representation of these signal samples $s(t_i)$, control generator 45 in FIG. 4 and in FIG. 7 comprises a digital quadrature modulation circuit 35 connected to a first read-only memory 21 having two memory sections 21(1) and 21(2), in the addressable locations of which digital numerical values are stored which represent two modulation parameters $\cos[\phi(t_i)]$ and $\sin[\phi(t_i)]$, $\phi(t)$ being the phase of the desired TFM-signal $s(t)$.

In contrast therewith, in FIG. 9 the two control signals TS and ZI are not derived from the samples $s(t_i)$ of the analog TFM signal $s(t)$ itself, but from the angles $\theta(t_i)=\theta_i$ which correspond therewith in accordance with the relation:

$$s(t_i)=\sin[\phi(t_i)]=\sin\theta_i \tag{32}$$

To that end, digital numerical values are stored in FIG. 9 in addressable locations of first read-only memory 21, which values represent the modulation parameter $\theta(t_i)=\theta_i$, the angle $\theta(t)$ being the argument of the desired TFM signal $s(t)$. In FIG. 9 it is assumed that the angle $\theta_i$ is available in sign-and-magnitude representation at the output of read-only memory 21. From the bits which represent the magnitude $|\theta_i|$ and the sign $\text{sgn}\theta_i$, the two control signals TS and ZI for zero-crossing generator 41 are derived in a control generator 45 which processes these bits in FIG. 9 in the same way as control generator 45 in FIG. 7. Thus, arrangement 4/5 in FIG. 9 is of a simpler structure than arrangement 4/5 in FIG. 4 with a control generator 45 as shown in FIG. 7, as control generator 45 of FIG. 9 does not use a quadrature modulation circuit 35 and a conversion circuit 49 such as they are used in FIG. 7.

Now it might be imagined that in FIG. 9 the simplicity of structure can only be accomplished at the cost of a considerable increase in the capacity of first read-only memory 21, and a corresponding extension of addressing circuit 22, as the values stored in read-only memory 21 represent the argument $\theta(t)$ of the TFM-signal $s(t)$ and the expression for this argument $\theta(t)$ does not only contain the phase $\theta(t)$ which depends on the data signal $b(t)$ with symbol rate $1/T$ to be transmitted, but also a term $\omega_c t$ which is exclusively determined by the frequency $f_c$ of the (intermediate) carrier signal and which consequently does not depend on this data signal $b(t)$.

However, it was surprisingly found that the above problem can be completely avoided by an appropriate choice in FIG. 9 of the (intermediate) carrier signal. This is more specifically the case for the choice of this (intermediate) carrier signal which as already mentioned in the description of FIG. 7, which choice, on the basis of formulae (26)–(28), results in the relation:

$$\theta_i = i\pi/2 + \phi_i \tag{33}$$

between the values of the argument $\theta(t)$ and the phase $\phi(t)$ at the instant $t=t_i=iT_s+T_s/2$. From Table II gives for this choice it will then be clear that to obtain the samples of TFM-signal $s(t)=\sin[\theta(t)]$, at consecutive sampling instants $t_{i-1}, t_i, t_{i+1}, t_{i+2}, \ldots$, the stored values of $\cos[\phi(t)]$ and $\sin[\phi(t)]$ are only used alternately, but never simultaneously, and that furthermore every other two sampling instants (in Table II; after $t_i$, $t_{i+2}, t_{i+4}, \ldots$) the sign of the stored values of $\cos[\phi(t)]$ and $\sin[\phi(t)]$ is inverted. This simple digital quadrature modulation process can now implicitly be carried out in first read-only memory 21 of FIG. 9 by arranging the storage of the values of the argument $\theta(t)$ in accordance with the third column of Table II. These values of the argument $\theta(t)$ are stored in sign-and-magnitude representation, the magnitude $|\theta(t)|$ varying between 0 and $\pi/2$ rad, and furthermore both the information about the phase quadrant of the phase $\phi(t)$, compare the description of FIG. 2, and also the sign inversion of the modulation procedure are expressed in the sign sgn$[\theta(t)]$. Consequently, first read-only memory 21 of FIG. 9 need only have a capacity equal to the capacity of one of the two memory sections 21(1), 21(2) of FIG. 4 for the general case, and addressing circuit 22 of FIG. 4 can be used without any modification in FIG. 9.

In the case described above, the choice $f_c=f_s/4$ for the carrier frequency $f_c$ implies that for a sampling rate $f_s=q/T$ with $q=8$, one period of the carrier frequency $f_c$ is accurately equal to half the symbol period T, and this fact has been utilized to accommodate also the sign inversion of the modulation procedure in the sign sgn$[\theta(t)]$ which is stored in first read-only memory 21. More generally, the choice $f_c=f_s/4$ implies that between the carrier period $1/f_c$ and the symbol period T there is the relation:

$$Tf_c = q/4 \qquad (34)$$

and that the sign inversion of the modulation procedure can be implicitly effected in first read-only memory 21 for interpolation factors q for which q/4 is an integer (where $q/4 \geq 2$ to prevent spectral overlap, compare the above description with reference to formula (10)).

For the sake of completeness, it should be noted that the procedures used in FIG. 9 for arranging the storage in the first read-only memory 21 are not limited to the described TFM modulation method for binary data signals, but may be of general use for different types of data signals and for a large variety of modulation methods, such as n-PSK, n-PRCPM and CORPSK, provided the conditions of formulae (21) and (22) are always satisfied, that is to say provided the variation of the argument $\theta(t)$ within one sampling period $T_s$ is at most $\pi$ rad.

Figure 10:
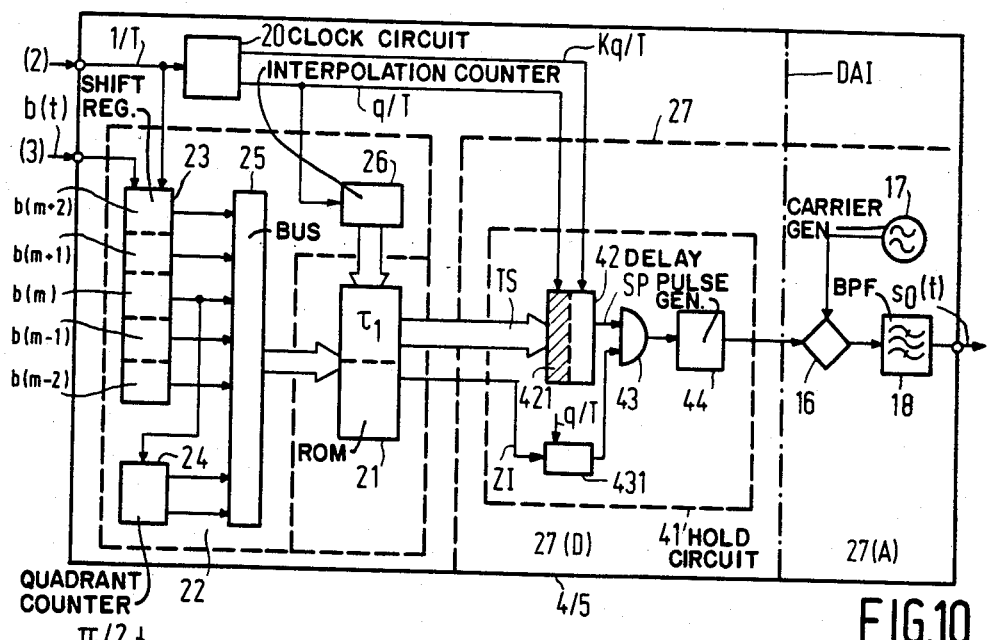
FIG. 10 shows a block diagram of a third embodiment of an arrangement according to the invention for generating a TFM-signal.

Description of the Embodiment in FIG. 10

FIG. 10 shows a block diagram of an arrangement 4/5 in accordance with the invention having a still simpler structure than the argument 4/5 in FIG. 9. Corresponding elements in both Figures are again given the same reference numerals.

In the arrangements 4/5 described so far, the two signals TS and ZI for the control of zero-crossing generator 41 are derived from the samples $s(t_i)$ of TFM signal $s(t)$ or from the corresponding samples $\theta(t_i)$ of the argument $\theta(t)$ of TFM signal $s(t)$. To derive the two control generator 45 connected to a first read-only memory 21, in which the stored values represent the modulation parameters $\cos[\theta(t_i)]$ and $\sin[\phi(t_i)]$ for the case of FIG. 4 and its variant, and the modulation parameters $\theta(t_i)$ for the case of FIG. 9.

The essential difference between FIG. 4 and FIG. 9 on the one hand and FIG. 10 on the other hand is that in FIG. 10 the two control signals TS and ZI of zero-crossing generator 41 are not obtained with the aid of a control generator 45 from modulation parameters stored in first read-only memory 21, but that they are now stored themselves as modulation parameters in first read-only memory 21. This measure accomplishes a considerable savings in the number of required elements and more specifically in the overall required memory capacity as arrangement 4/5 in FIG. 10 need not make use of a control generator 45 with a second read-only memory 47 as used in FIG. 9.

The measure taken in FIG. 10 is based on the consideration that for the choice of the carrier signals made in FIG. 9 the occurrence of a zero-crossing at the output of generator 41 at an instant $t=t_i+\tau_1$ within a symbol interval (mT, mT+T) is ultimately completely determined by the data symbols $b(m+2)$, $b(m+1)$, $b(m)$, $b(m-1)$, $b(m-2)$ then present in shift register 23 of addressing circuit 22.

In point of fact the quantized time delay $\tau_1$ of this zero-crossing is determined in accordance with formula (25) by the relation:

$$\tau_1 = K_0|\theta_{i-1}|/(|\theta_{i-1}|+|\theta_i|) \qquad (35)$$

and this zero-crossing only occurs if the condition:

$$\text{sgn } \theta_i \neq \text{sgn } \theta_{i-1} \qquad (36)$$

is satisfied, the arguments $\theta_{i-1}$, $\theta_i$ themselves being determined by the relation of formula (33):

$$\theta_i = i\pi/2 + \phi_i \qquad (37)$$

As is extensively explained in the description of FIG. 2, within a symbol interval (mT, mT+T) the value modulo-$2\pi$ of the phase $\phi_i$ is fully determined for each phase quadrant by the data symbols $b(m+2)$, $b(m+1)$, $b(m)$, $b(m-1)$, $b(m-2)$ then present in shift register 23, and the shape of the desired impulse response $g(t)$ of premodulation filter 7 in FIG. 4 which is limited to a length 5T, and furthermore the number y(m) modulo-4 of this phase quadrant is determined by the preceding number y(m−1) and the data symbols b(m), b(m−1) of Table I. This knowledge of the possible values of phases $\phi_i$ and consequently of arguments $\theta_{i-1}$, $\theta_i$ makes it possible to calculate the time delay $\tau_1$ in accordance with formula (35) and to store them as a time setting signal TS, and also to assess the satisfaction of condition (36) and to store it as zero-crossing indication signal ZI.

If now in FIG. 10 the sampling period $T_s$ is again subdivided into K=32 sub-periods $\tau_o$ and consequently time delay $\tau_1$ is represented by a binary number of k=5 bits, then in each location of first read-only memory 21 there are stored (k+1)=6 bits for the representation of the two signals TS and ZI. For the already repeatedly mentioned value q=8 for the interpolation factor, first read-only memory 21 in FIG. 10 has a 10-bit wide address and thus in FIG. 10 only a total memory capacity equal to the capacity of $6\times2^{10}$ bits of first read-only memory 21 is required. As mentioned in the explanation in the preceding sections D(3) and D(4), first read-only memory 21 in FIG. 9 has also a 10-bit wide address when q=8, so that for the described representation of $|\theta_i|$ by a binary 7-bit number only 7+1=8 bits are required for each location and the capacity of first read-only memory 21 in FIG. 9 then amounts to $8 \times 2^{10}$ bits. However, FIG. 9 also requires a second read-only memory 47 for storing the time delay $\tau_1$ and from the explanatory description in section D(3) it will be apparent that with the values $K=32$ and $q=8$, even if an error of less than 2% in the determination of $\tau_1$ in accordance with (25) is accepted, this second read-only memory 47 still need have a capacity of $5 \times 2^{10}$ bits, so that even in this case the overall required storage capacity in FIG. 9 still amounts to $13 \times 2^{10}$. Consequently, compared with FIG. 9, the overall required memory capacity is reduced by a factor exceeding 2 by using the measure illustrated in FIG. 10.

Practical implementation of an embodiment as shown in FIG. 10

If now in a practical implementation of an arrangement 4/5 of the type shown in FIG. 10 also a maximum error of not more than 2% in the determination of the time delay $\tau_1$ of the zero-crossings at the output of the digital section 27(D) of signal processor 27 is acceptable, the overall required memory capacity can still be further reduced.

Figure 11:
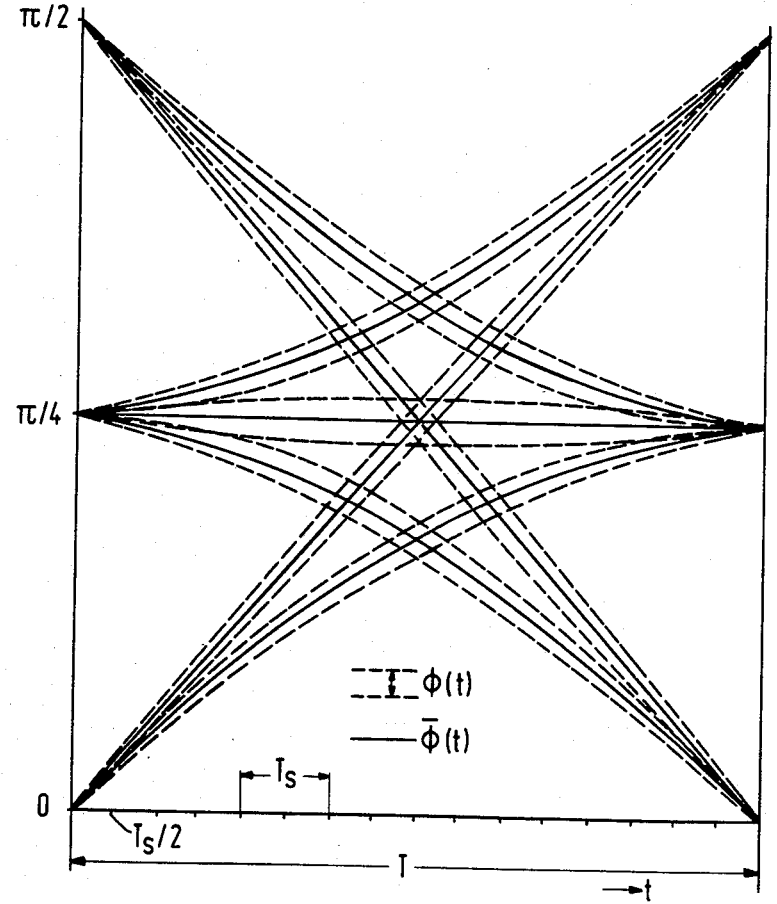
FIG. 11 shows a time diagram of characteristic phases of a TFM signal which are used in a practical embodiment of the arrangement of FIG. 10.

To that end, use is made of the fact already mentioned in section D(1) tht the shape of phase $\phi(t)$ of TFM signal s(t) within a symbol interval (mT, mT+T) is predominantly determined by the filtered version of the three consecutive data symbols b(m+1) b(m), b(m−1) present in formula (2). Shift register 23 is now reduced in length so that only the three symbols b(m+1), b(m), b(m−1) are present therein, but in contrast to the arrangements described in the foregoing, in the practical implementation of FIG. 10 the central interval pT to which the pulse response g(t) of premodulation filter 7 in FIG. 1 is limited, is not chosen in accordance with the three elements of shift register 23, but is much greater than pT=3T, for example pT=7T. At p=7, the number of possible shapes of phase $\phi(t)$ within one symbol period T indeed amounts to $2^p = 2^7 = 128$, but these 128 shapes of phase $\phi(t)$ can be distributed over $2^3 = 8$ main trajectories, each trajectory corresponding to one of the eight possible combinations b(m+1), b(m), b(m−1) in formula (2) for the amount of the phase change $\phi(mT+t) - \phi(mT)$ in the relevant symbol interval, the 16 possible shapes of $\phi(t)$ forming for each main trajectory a narrow band on both sides of a characteristic phase $\overline{\phi}(t)$ obtained by determining the average value of these 16 possible phases $\phi(t)$ at each instant t. In FIG. 11, the shapes of this characteristic phase $\overline{\phi}(t)$ for the 8 possible combinations b(m+1), b(m), b(m−1) in the first phase quadrant (0, $\pi/2$) are illustrated by solid lines and the boundaries of the narrow band of 16 possible phases $\phi(t)$ associated with each characteristic phase $\overline{\phi}(t)$ are illustrated by broken lines. The phase $\phi(t)$ and the boundaries of the band of phases $\phi(t)$ for the combination b(m+1), b(m), b(m−1)=−1, +1, −1 and b(m+1), b(m), b(m−1)=+1, −1, +1 fully coincide in practice, it holding that $\overline{\phi}(t) = \pi/4$, so that FIG. 11 shows only 7 different phases $\overline{\phi}(t)$. The highest value of the standard deviation of the bands of phases $\phi(t)$ relative to the characteristic phases $\overline{\phi}(t)$ is less than $\pi/128$ rad.

When making the calculations mentioned in the preceding section D(t) for determining the time delays $\tau_1$ in accordance with formula (35) and satisfying condition (36), the values $\overline{\phi}_i$ of the characteristic phases $\overline{\phi}(t)$ at sampling instants $t = t_i = iT_s + T_2/2$ are now used instead of the phases $\phi_i$. For the calculation of time delay $\tau_1$ in accordance with formula (35) it is tracitly assumed in section D(5) that the values $\theta_{i-1}$ and $\theta_i$ of formula (37) contained therein are fully determined by known values $\phi_{i-1}$ and $\phi_i$. This assumption is absolutely correct for values $\phi_{i-1}$ and $\phi_i$ within the same symbol interval (mT, mT+T), but is only partly true when $\phi_{i-1}$ is located in this symbol interval and $\phi_i$ is located in the subsequent symbol interval (mT+T), (mT+2T). However, it has been found that for the already repeatedly mentioned values $K=32$ and $q=8$, this fact does not introduce any additional errors in the determination of the quantized time delay $\tau_1$, as for a given combination b(m+1) b(m), b(m−1) and consequently a given main trajectory having a characteristic phase $\overline{\phi}(t)$ in symbol interval m(T, mT+T), only two different main trajectories are possible in the subsequent symbol interval (mT+T, mT+2T), as the main trajectory in this last interval is determined by the combination b(m+2), b(m+1), b(m), in which the symbols b(m+1), b(m) have already been given and symbol b(m+2) can assume the value +1 or −1. From formula (2) it follows that the characteristic phases $\overline{\phi}(t)$ of these two main trajectories at the instant $t = mT + 2T$ always have a difference of $\pi/4$ rad, but at sampling instant $t_i = mT + T + T_2/2$, the two possible values $\overline{\phi}_i$ show a much smaller difference, as will be evident from FIG. 11 for the case in which $q=8$ and consequently $T_s = T/8$. If now time delay $\tau_1$ is determined in accordance with formula (35) on the basis of the value $\overline{\phi}_{i-1}$ at sampling instant $t_{i-1} = mT + T - T_s/2$ and the value $\overline{\phi}_i$ at sampling instant $t_i = mT + T + T_s/2$, then the influence of b(m+2) on the value of $\tau_1$ appears to be less than one sub-period $\tau_0$ for $K=64$ and to result only in a few cases in a different value $\tau_1$; it does so, for example, when the combination b(m+2), b(m+1), b(m), b(m−1) is equal to ±1, +1, +1, +1 but not when this combination is equal to ±1, −1, +1, −1. For $K=32$ the influence of b(m+2) does not result in any of these bases in differences in the value of time delay $\tau_1$, so that the maximum error is then less than 2%. This result holds for a three-element shift register 23 when the characteristic phase $\overline{\phi}(t)$ is utilized, but also for a five-element shift register 23 described in section D(t), when the phase $\phi(t)$ itself is utilized, as in the latter case symbol b(m+2) has already been given and consequently also the main trajectory with characteristic phase $\phi(t)$ in the subsequent symbol interval (mT+T, mT+2T) is known. The value +1 or −1 of symbol (m+3) then results in two possible phases $\phi(t)$ within the narrow band on both sides of characteristic phase $\overline{\phi}(t)$ of this given main trajectory, a difference between the two possible values $\phi_i$ at sampling instant $t_i = mT + T + T_s/2$ having the same low value as the difference between the two possible values $\overline{\phi}_i$ at this instant for the values +1 or −1 of symbol b(m+2), as will also be apparent from FIG. 11.

When use is made of a shift register 23 having only three elements, and thus of 8 characteristic phases $\overline{\phi}(t)$, for the practical implementation of arrangement 4/5 of FIG. 10, then this results in a maximum error of less than 2% in the quantized time delay $\tau_1$ of the zero-crossings when using the above mentioned values $q=8$ and $K=32$. In this case first read-only memory 21 has an address of only 8 bits and the overall required memory capacity only amounts to $6 \times 2^8 = 1536$ bits, which is a reduction by a factor of 4 compared with the case described in the preceding section D(5).

Thanks to the use of a presettable counter as the circuit 42 for the introduction of the time delay $\tau_1$, this practical implementation of arrangement 4/5 operates in full synchronism with the data symbol rate 1/T and consequently a wide range of symbol rates can be processed without any circuit adjustment. This renders the digital signal processing section of this arrangement 4/5 particularly attractive for monolithic integration.

The highest permissible symbol rate 1/T is governed by the frequency Kq/T of the (second) clock signal for presettable counter 42, which itself determines the smallest sub-period $\tau_o = T/(Kq)$ for time delay $\tau_1$. With the values K=32 and q=8, a symbol rate 1/T=72 KHz then results for counter 42 in a clock frequency of 18.432 MHz which still is within the capabilities of for example the n-MOS technology for monolithic integration (the use of n-MOS technology is attractive in view of its low power dissipation).

Figure 12:
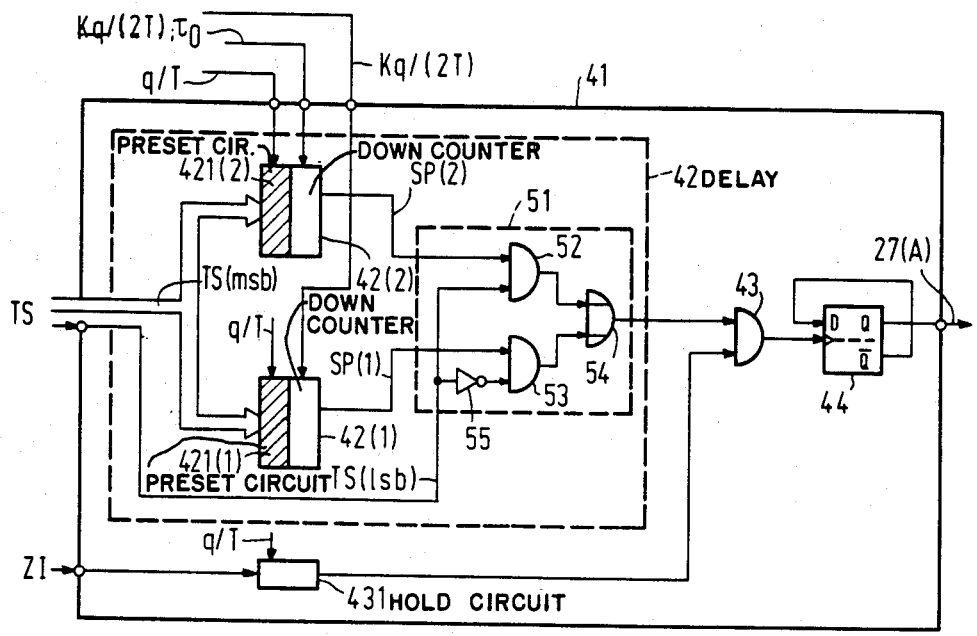
FIG. 12 shows a block diagram of a zero-crossing generator used in the arrangement of FIG. 10 for higher symbol frequencies.

A possibility to prevent the counter in delay circuit 42 from being compelled to operate with a high clock frequency is provided by multiplexing two or more counters. An example of multiplexing two counters is shown in the block diagram of FIG. 12 for a zero-crossing generator 41. Delay circuit 42 in FIG. 12 comprises two presettable (k−1)-bit down-counters 41(1) and 42(2) which at their counting input receive a clock signal having a frequency Kq/(2T), that is to say half the original value Kq/T of the second clock signal in FIG. 10, the clock signal for down-counter 42(2) being a version of the clock signal for down-counter 42(1) which is delayed by a time $\tau_o = T/(Kq)$. The two presetting circuits 421(1) and 421(2) are controlled by first clock signals at a rate q/T to set the two counters 42(1) and 42(2) to a counting position which corresponds to the (k−1) most significant bits of the k-bit time-setting signal TS. The respective set pulses SP(1) and SP(2) of counters 42(1) and 42(2) are applied to a switch 51 which is controlled such by the least significant bit of time-setting signal TS that set pulse SP(2) is passed-on at a logic value "1" of this bit, and consequently set pulse SP(1) is passed-on at a logic valve "0". Switch 51 is, for example, formed by two AND-gates 52 and 53, an OR-gate 54 and an inverter 55 which are connected in a known manner, as shown in FIG. 12.

Since $\tau_o$ is the quantizing unit for time delay $\tau_1$, time-setting signal TS has a least significant bit of the logic value "1" when $\tau_1$ is an odd multiple of $\tau_o$ and a logic value "0" when $\tau_1$ is an even multiple of $\tau_o$. In the first case, set pulse SP(2) is transferred to AND-gate 43 and set pulse SP(1) in the second case. Thanks to the delay $\tau_o$ of the clock signal for counter 42(2) relative to the clock signal for counter 42(1) and to the above-mentioned control of switch 51 by the least significant bit of time-setting signal TS, the set pulse SP applied to AND-gate 43 always occurs at the appropriate instant. This will be described in greater detail with reference to an example. For K=32, TS is a binary number with k=5 bits. For $\tau_1 = 6\tau_o$ and $\tau_1 = 7\tau_o$ TS has the form "00110" and "00111", respectively. For both cases the counters 42(1) and 42(2) are set to a counting position 3 corresponding to the 4 most significant bits "0011" of TS and these counters 42(1), 42(2) produce a set pulse after 3 clock pulses (having a clock period $2\tau_o$), SP(1) appearing at instant $t_i + 6\tau_o$ and SP(2) appearing at instant $t_i + 7\tau_o$. For the case in which $\tau_1 = 6\tau_o$, TS has a least significant bit "0" and consequently switch 51 transfers SP(1) at instant $t_i + 6\tau_o$; for the case in which $\tau_1 = 7\tau_o$, TS has a least significant bit "1" and consequently switch 51 transfers SP(2) at instant $t_i + 7\tau_o$.

For the above-mentioned value of 18.432 MHz of a clock rate still acceptable for monolithic integration in n-MOS technology, it is possible to achieve by multiplexing the counters 42(1) and 42(2) that the highest permissible symbol rate 1T is increased from the value of 72 kHz to a vaue of 144 kHz. Similarly, the permissible symbol rate 1/T can be doubled once again by providing four presettable (k−2)-bit down-counters 42(.), which receive clock signals at their counting inputs having a rate Kq/(4T) and having mutual delays $\tau_o = T(Kq)$ and which are set by the (k−2) most significant bits of time-setting signal TS, and by further using a switch 51 which is then controlled by the 2 least significant bits of time-setting signal TS.

Power density spectrum

Figure 13:
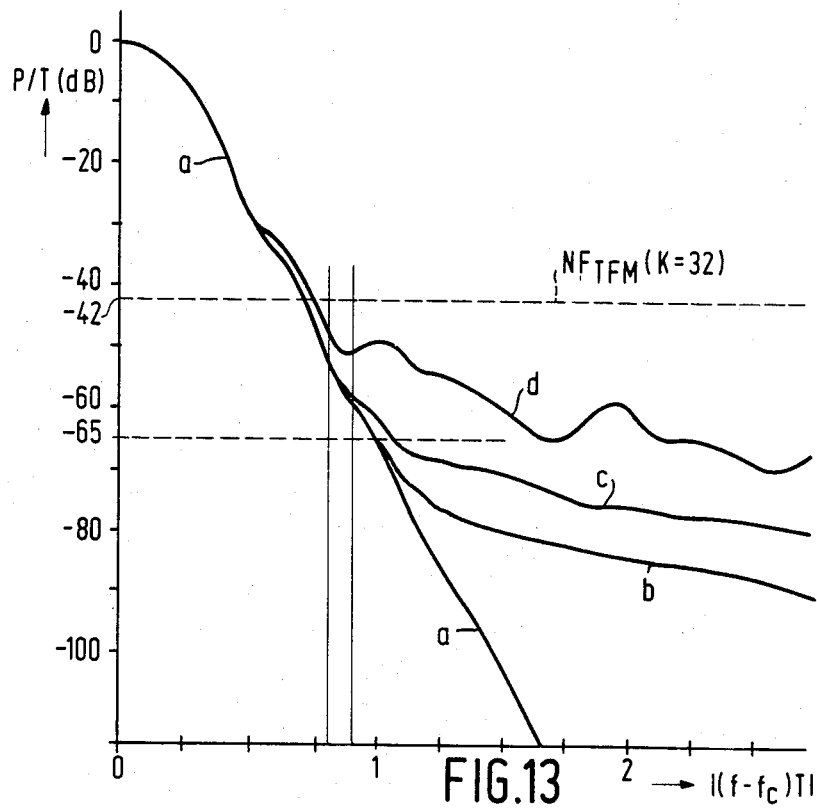
FIG. 13 shows power density spectra of different types of TFM-transmitters.

FIG. 13 shows the spectral power density P/T as a function of the normalised frequency $|(f-f_c)T|$ for the output signal of several types of TFM transmitters.

Curve a in FIG. 13 shows the spectrum P/T at the output of arrangement 4 in FIG. 1 for the ideal case of impulse response g(t) of premodulation filter 7 having an infinite duration. When arrangement 4 is used in FIG. 2 a certain reduction in the duration of impulse response g(t) must be accepted, use being made of the fact that this impulse response g(t) has its most significant values in a central interval of a length 3T and that its values outside a central interval of length 7T deviates only to a small extent from the zero value. The influence of these reductions in the duration of impulse response g(t) on the spectrum P/T at the output of arrangement 4 in FIG. 2 is illustrated in FIG. 13 by curve b for a limitation to 7T and by curve c for the extensively-described case of a limitation to 5T. The deviations of these curves b and c relative to curve a first get real significance for frequencies f for which $|(f-f_c)T|$ exceeds 1. However for frequencies f for which $|(f-f_c)T|$ has approximately the value 1.5, the level of spectrum P/T for these curves b and c is still approximately 30 dB and 70 dB, respectively, lower than the level for carrier frequency $f_c$. The disturbances, which the remaining power outside the actual frequency band of the spectral main lobe produces in adjacent transmission channels, have also in the case of curve c a level which is sufficiently low for the vast majority of the practical applications in radio-communication systems. (For the sake of completeness it should be noted that curves a, b and c in FIG. 13 are already known from U.S. Pat. No. 4,229,821; cf. FIG. 10).

The practical implementation of arrangement 4/5 of FIG. 10, already described in the preceding section D(6), utilizes a shift register 23 having only 3 elements and the 7 different shapes of the characteristic phases $\bar{\phi}(t)$ for the 8 possible combinations of data symbols b(m+1), b(m), b(m−1) in this shift register 23, as shown in FIG. 11 for the first phase quadrant (0, $\pi/2$). These characteristic phases $\bar{\phi}(t)$ are obtained by limiting the duration of impulse response g(t) to a central interval of length 7T, by distributing the 128 possible forms of phase $\phi(t)$ over 8 main trajectories and by determining the characteristic phases $\bar{\phi}(t)$ as the average value of the 16 possible shapes of phase $\phi(t)$ for each main trajectory. If now arrangement 4 of FIG. 2 also utilizes a shift register having only 'elements and the characteristic phases $\bar{\phi}(t)$, that is to say if cos $[\bar{\phi}(t)]$ and sin $[\bar{\phi}(t)]$ are stored as modulation parameters in sections 21(1) and 21(2) of first read-only memory 21, then this results in a spectrum P/T at the output of arrangement 4 in FIG. 2 as illustrated by curve d in FIG. 13. Consequently, the use of this characteristic phase $\bar{\phi}(t)$ results in a spectrum which for frequencies f for which $|(f-f_c)T|$ has a value exceeding 0.6 starts to deviate from the spectrum for the ideal case of curve a, but which for values $|(f-f_c)T|$ of approximately 1.5 still has a level which is approximately 60 dB lower than the level for carrier frequency $f_c$. The remaining power outside the frequency band of the spectral main lobe can then be suppressed with the aid of a bandpass filter having cut-off frequencies at the frequencies f for which $|(f-f_c)T|$ has a value between 0.8 and 0.9, as will be obvious from FIG. 13. So as to reduce possible amplitude fluctuations of the angle-modulated signal due to the use of this bandpass filter, this filter must have a maximally flat response within its passband.

In the practical implementation of arrangement 4/5 of FIG. 10, use is also made of this characteristic phase $\bar{\phi}(t)$, but now to determine the time delay $\tau_1$ of the zero-crossings of the two-level signal at the output of digital signal-processing sections 27(D). The spectrum P/T of this two-level signal at the output of section 27(D) has a noise floor which is affected by the accuracy in the determination of the zero-crossings, an effect which can be compared with the noise floor caused by the finite accuracy of DAC circuits. A greater accuracy of the zero-crossings and consequently a lower noise floor of spectrum P/T can be obtained by increasing the number K of the sub-periods $\tau_o$ into which the sampling period $T_s$ has been divided. Since sub-periode $\tau_o$ is the quantizing unit for the determination of time delay $\tau_1$ and the maximum error on quantizing $\tau_1$ is consequently equal to half the sub-period $\tau_o/2 = T_s/(2K)$, then it holds in general that the noise floor NF of power density spectrum P/T of a signal is given by the relation $$NF = C_2/(2K) \qquad (38)$$

where $C_2$ is a proportionality constant which depends on the type of signal. For TFM signals this constant $C_2$ has a value 0.5 when the values +1 and -1 of the data symbols to be transmitted occur with equal probabilities (random data signal) on the basis of the signal statistics for TFM, so that it holds that $$NF_{TFM} = 1/(4K) \qquad (39)$$

Using the repeatedly mentioned value K=32 results in a noise floor $NF_{TFM}$ which is approximately 42 dB lower than the level for carrier frequency $f_c$. This value has also been found in practice and is shown in FIG. 13 by a broken line.

This value of $-42$ dB for the noise floor can be further reduced by using a bandpass filter 18 of appropriately chosen bandwidth in the frequency conversion in the analog signal-processing section 27(A) of FIG. 10. When a suitable crystal filter 18 having a bandwidth (at the $-3$ dB points) of approximately twice the symbol rate 1/T is used, it was found in practice that the noise floor of TFM-signal $s_o(t)$ at the output of arrangement 4/5 in FIG. 10 is approximately 65 dB lower than the level for carrier frequency $f_c$. This last value of $-65$ dB for the noise floor is also shown in FIG. 13 by means of a broken line.

Practical implementation for very high symbol rates

Also for very high symbol rates 1/T, for example of the order of 30 to 40 MHz as used in satellite communication, an arrangement 4/5 of the type shown in FIG. 10 is very attractive. In the practical implementation of such an arrangement 4/5 use can also be made of the measures described in the preceding sections D(6), (7), such as a shift register 23 having only three elements, time delays $\tau_1$ determined on the basis of characteristic phases $\bar{\phi}(t)$ and a filter 18 with a suitable bandwidth for the reduction of the noise floor NF of spectrum P/T. Given the high frequencies of the required clock signals, logic circuits (gates, flip-flops, counters) are then preferably realized with the aid of non-saturated bipolar logic, for example the ECL-family (Emitter-Coupled-Logic). In this implementation advantageous use can be made of the measures shown in the block circuit diagram of FIG. 14 which differs from FIG. 10 in two respects.

Figure 14:
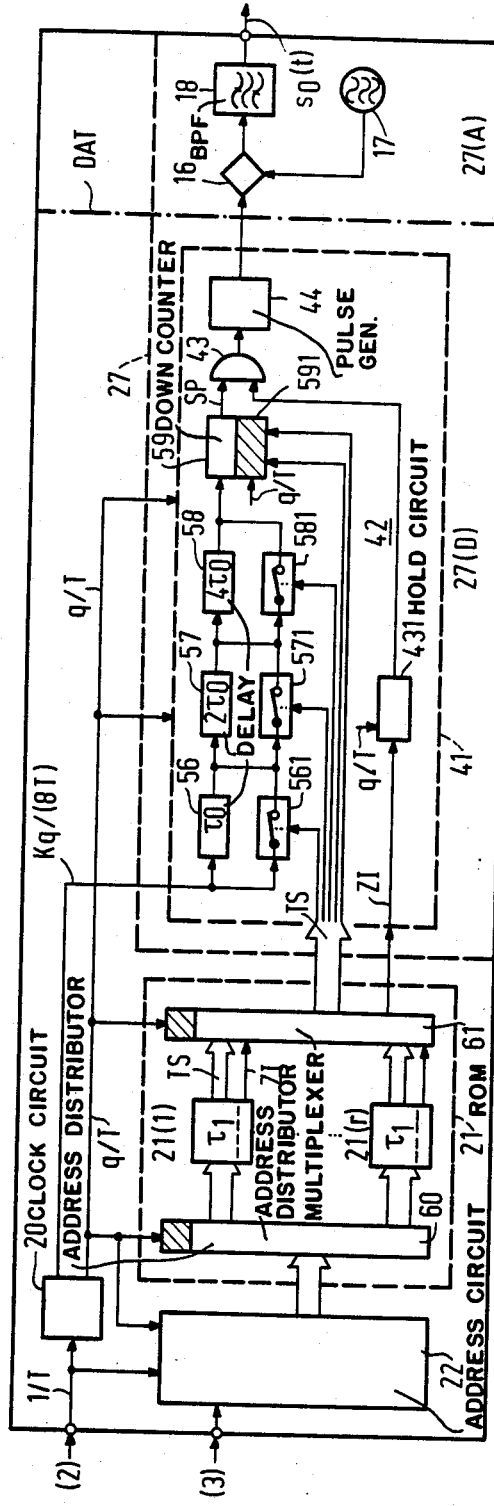
FIG. 14 shows a variant of the arrangement of FIG. 10 suitable for very high symbol frequencies.

In the first place, in FIG. 14 the time delays are introduced by means of a circuit 42 in which already extensively described counting techniques are combined with fixed delay lines. For the introduction of values $\tau_7$ in the range (0,7 $\tau_o$) circuit 42 comprises the series arrangement of three delay lines 56, 57, 58 producing respective time delays $\tau_o$, $2\tau_o$, $4\tau_o$ which can be inserted or not inserted by means of associated switches 561, 571, 581 under the control of the three least significant bits of time-setting signal TS, a logic value "1" of such a bit opening the relevant switch for inserting the corresponding delay line. To introduce values $\tau_1$ equal to multiples of $8\tau_o$ circuit 42 comprises a presettable (k$-$3)-bit down-counter 59 which—through the series arrangement of delay lines 56, 57, 58—receives at its counting input a clock signal having a frequency Kq/8T which is a factor of 8 lower than the original value Kq/T of the second clock signal in FIG. 10. This down-counter 59 has a presetting circuit 591 which is controlled by the first clock signal of frequency q/T to preset down-counter 59 to a counting position corresponding to the (k$-$3) most significant bits of time-setting signal TS. On the basis of an example it will now be illustrated that circuit 42 in FIG. 14 conveys set pulse SP always at the appropriate instant $t_i+\tau_1$ to AND-gate 43. For K=32 time-setting signal TS is a binary number having k=5 bits and for time delays $\tau_1=23\tau_o$, $\tau_1=19\tau_o$ and $\tau_1=4\tau_o$ TS then has the respective forms "10111", "10011" and "00100". In the first and second cases, counter 59 is set to a counting position which corresponds to the k$-$3=2 most significant bits "10" of TS and after 2 clock pulses (having a clock period 8T/(Kq)=$8\tau_o$) this counter produces a set pulse SP. In the first case, the 3 least significant bits "111" of TS open all the switches 561, 571, 581 so that counter 59 receives the clock signal with a delay of $7\tau_o$ and consequently SP occurs at instant $t_i+7\tau_o+2(8\tau_o)=t_i+23\tau_o$; in the second case, the 3 least significant bits "011" of TS only open the switches 561, 571 so that counter 59 receives the clock signal with a delay $3\tau_o$ and consequently SP occurs at instant $t_i+3\tau_o+2(8\tau_o)=t_i+19\tau_o$. In the third case, the 2 most significant bits "00" of TS preset counter 59 to a counting position 0 and the 3 least significant bits "100" of TS open only switch 581, so that counter 59 receives the clock signal with a delay $4\tau_o$ and consequently SP occurs at instant $t_i+4\tau_o$.

Thanks to these measures, a symbol rate 1/T=40 MHz and the values K=32 and q=8 result in a clock rate for counter 59 having a value of 1.28 GHz, instead of the value of 10.24 GHz then required in FIG. 10 for counter 42. In this case $\tau_o=T/(Kq)$ has a value of approximately 0.1 ns so that the delay lines 56, 57, 58 can be in the form of simple strip delay lines of appropriate lengths.

In this example, the first clock rate q/T has a value of 320 MHz and in FIG. 10 this implies that the cycle time for first read-only memory 21 has a value of 3.125 ns. In the second place, FIG. 10 shows a possibility to prevent problems caused by the required, very short access times of the order of a few ns. To that end, first read-only memory 21 in FIG. 14 is constituted by r read-only memories 21(1), . . . 21(r) which each have the same contents and each have its address input connected to a separate output of an address distributor 60. This address distributor 60 is controlled by the first clock signal of frequency q/T and cyclically distributes the 8-bit addresses generated by addressing circuit 22 at this frequency q/T over its r outputs, so that each of the r read-only memories 21(1), . . . 21(r) is addressed at the r-times lower frequency q/(rT). The values of the control signals TS and ZI read from read-only memories 21(1), . . . 21(r) are applied at the required rate q/T to zero-crossing generator 41 with the aid of a multiplexer 61 which is also controlled by the first clock signal of frequency q/T and those r inputs are connected to the read output of the respective read-only memories 21(1), . . . 21(r). The value of r is determined by the ratio of the cycle time of the practically available read-only memories to the required cycle time of 3.125 ns.

Use of the arrangement for signals having a non-constant amplitude

The embodiments of the invention described so far all relate to generating an analog angle-modulated carrier signal of a constant amplitude in response to data signals of given symbol rates. The invention is, however, also suitable for use in arrangements for generating an analog amplitude-modulated or amplitude-and-phase-modulated carrier signal in response to data signals, when the carrier signal thus modulated is obtained by summing two phase-modulated carrier signals having the same carrier frequencies and the same, constant amplitudes. The basic circuit diagram of such a transmitter is known from UK patent application No. 2,095,492A (published Sept. 29, 1982) and will now be described with reference to FIG. 15.

Figure 15:
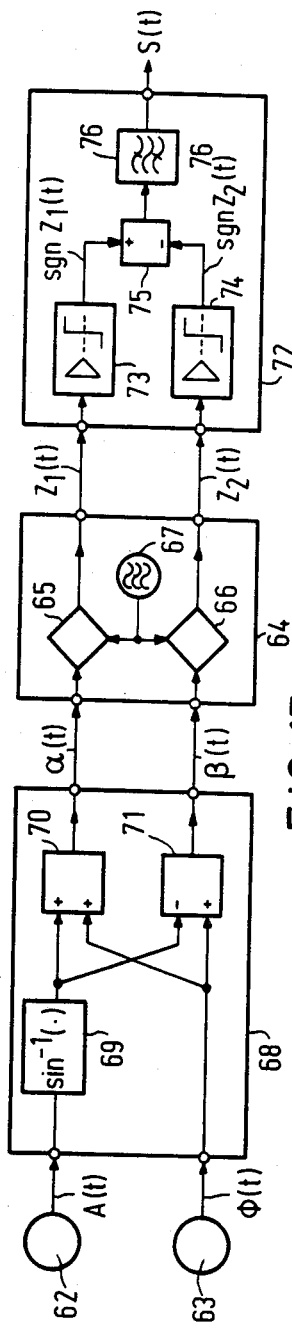
FIG. 15 shows a basic diagram of a data transmitter for generating an amplitude-and-phase-modulated signal by summing two phase-modulated signals of constant amplitude in accordance with United Kingdom Patent Application No. 2,095,492 A.

For generating an amplitude-and-phase-modulated signal S(t) of the form:

$$S(t) = A(t) \cdot \cos[\omega_c t + \phi(t)] \quad (40)$$

the transmitter in FIG. 15 comprises two sources 62 and 63 producing signals which represent the information-carrying amplitude A(t) and the information-carrying phase $\phi(t)$, respectively, A(t) being normalized such that $|A(t)| \leq 1$. In addition, this transmitter comprises a modulation stage 64 having two phase modulators 65 and 66, in which a carrier sin ($\omega_c t$) originating from an oscillator 67 is phase-modulated by two different signals $\alpha(t)$ and $\beta(t)$. The respective output signals $Z_1(t)$ and $Z_2(t)$ of these phase modulators 65 and 66 are given by:

$$Z_1(t) = \sin[\omega_c t + \alpha(t)] \quad (41)$$

$$Z_2(t) = \sin[\omega_c t + \beta(t)]$$

The modulating signals $\alpha(t)$ and $\beta(t)$ are derived from the signals A(t) and $\phi(t)$ of the source 62 and 63 with the aid of a signal transformer stage 68, in which signal A(t) is applied to an arcsin generator 69 for forming a signal arcsin A(t) which is added and subtracted, respectively, from signal $\phi(t)$ with the aid of an adder 70 and a subtractor 71. Signal $\alpha(t)$ is then obtained at the output of adder 70 and signal $\beta(t)$ at the output of subtractor 71, where:

$$\alpha(t) = \phi(t) + \arcsin A(t) \quad (42)$$

$$\beta(t) = \phi(t) - \arcsin A(t)$$

On the basis of formulae (42), the phase-modulated signals $Z_1(t)$ and $Z_2(t)$ can be written as:

$$Z_1(t) = \sin[\omega_c t + \phi(t) + \arcsin A(t)] \quad (43)$$

$$Z_2(t) = \sin[\omega_c t + \phi(t) - \arcsin A(t)]$$

These signals $Z_1(t)$ and $Z_2(t)$ are summed in an output stage 72 by subtracting $Z_2(t)$ from $Z_1(t)$, it being possible to write the difference signal $Z(t) - Z_2(t)$ after a simple trigonometrical conversion of formulae (43) as:

$$Z_1(t) - Z_2(t) = 2 \sin[\arcsin A(t)] \cdot \cos[\omega_c t + \phi(t)] \quad (44)$$

and consequently as:

$$Z_1(t) - Z_2(t) = 2A(t) \cdot \cos[\omega_c t + \phi(t)] \quad (45)$$

so that, apart from a constant factor 2, the desired amplitude-and-phase-modulated signal S(t) given by formula (40) is indeed obtained at the output of the stage 72.

To obtain a high power efficiency, stage 72 may be of a structure as shown in FIG. 15. The signals $Z_1(t)$ and $Z_2(t)$ are applied to class-D amplifiers 73 and 74, so that the two-level signals at their output can be represented by sgn[$Z_1(t)$] and sgn[$Z_2(t)$] whose zero-crossings correspond to the zero-crossings of the phase-modulated signals $Z_1(t)$ and $Z_2(t)$ as given in formulae (43). These two level signals are summed in a subtractor 75 which produces a three-level signal $$\text{sgn}[Z_1(t)] - \text{sgn}[Z_2(t)] \quad (46)$$

which is applied to a bandpass filter 76 having a centre frequency equal to carrier frequency $f_c$. At the conditions as mentioned in the derivation of formula (10) in section D(1), it can be demonstrated that the three-level signal of formula (46) comprises a term $$C_1[Z_1(t) - Z_2(t)] = 2C_1 A(t) \cdot \cos[\omega_c t + \phi(t)] \quad (47)$$

which can be selected with the aid of filter 76 and corresponds to the desired signal S(t) given by formula (40), but for a factor of $2C_1$, where $C_1 = 4/\pi$ is the same constant as in formula (10) so that the constant factor $2C_1$ is of no importance.

After the considerations of sections D(1)–D(6) it will be obvious that the transmitter of FIG. 15 imposes very strict requirements on the control of the analog circuit functions and that therefore advantageous use can be made of the arrangements according to the invention for generating each of the phase-modulated signals $Z_1(t)$ and $Z_2(t)$ when such a transmitter is used for transmitting data signals.

Figure 16:
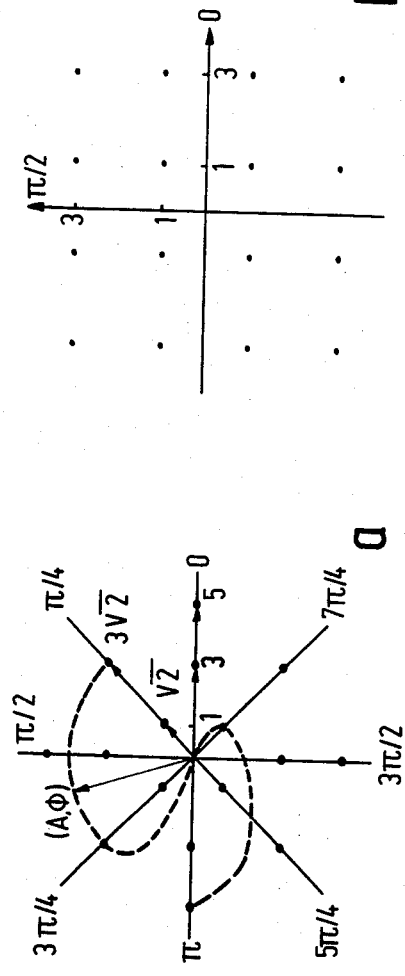
FIG. 16 shows two prior art 16-point signal constellations for amplitude-and-phase modulation of data signals.

The relationship between the data signals to be transmitted and the shapes of amplitude A(t) and phase $\phi(t)$ of the desired modulated signal S(t) are determined by the modulation method opted for. This modulation method is usually characterized by a two-dimensional signal constellation in which a discrete number of points represent the values of the amplitude-phase pair $A(t)$, $\phi(t)$ at the symbol instants $t=mT$, it being assumed that the filters used in the modulation method satisfy the first Nyquist criterion. In FIG. 16, two known 16-point constellations are shown for the transmission of binary data signals with a bit rate $4/T$, the symbols being formed by groups of 4 consecutive bits (quadbits), which are transmitted at a symbol rate $1/T$. Diagram a in FIG. 16 shows the known AM-PM constellation in accordance with CCITT Recommendation V.29 for transmitting data at a rate of 9600 bits per second and diagram b shows, by way of alternative, the known QAM constellation (Quadrature Amplitude Modulation) described in the article by Toschini, Gitlin and Weinstein in The Bell System Technical Journal, Vol. 52, No. 6, July-August 1973, pages 927-965. The numerical values of $A(t)$ in the diagrams a and b are relative amplitudes as $A(t)$ has been normalized such that $|A(t)| \leq 1$. The shape of the amplitude-phase pair $A(t)$, $\phi(t)$ for instants t within a symbol interval $(mT, mT+T)$ depends on the specific choice of the filter characteristic satisfying the first Nyquist criterion, large scale use being made of the class of Racos-characteristics (Racos=Raised-cosine), see for example the book "Principles of Data Communication", page 50-51, by Lucky, Saltz and Weldon Jr. New York, Mc-Graw Hill, 1968. When also in this case digital signal processing techniques are used for the filtering operation, then only the most significant values of the desired impulse response are utilized again in a central interval of length pT with $p=3$ or $p=5$.

Figure 17:
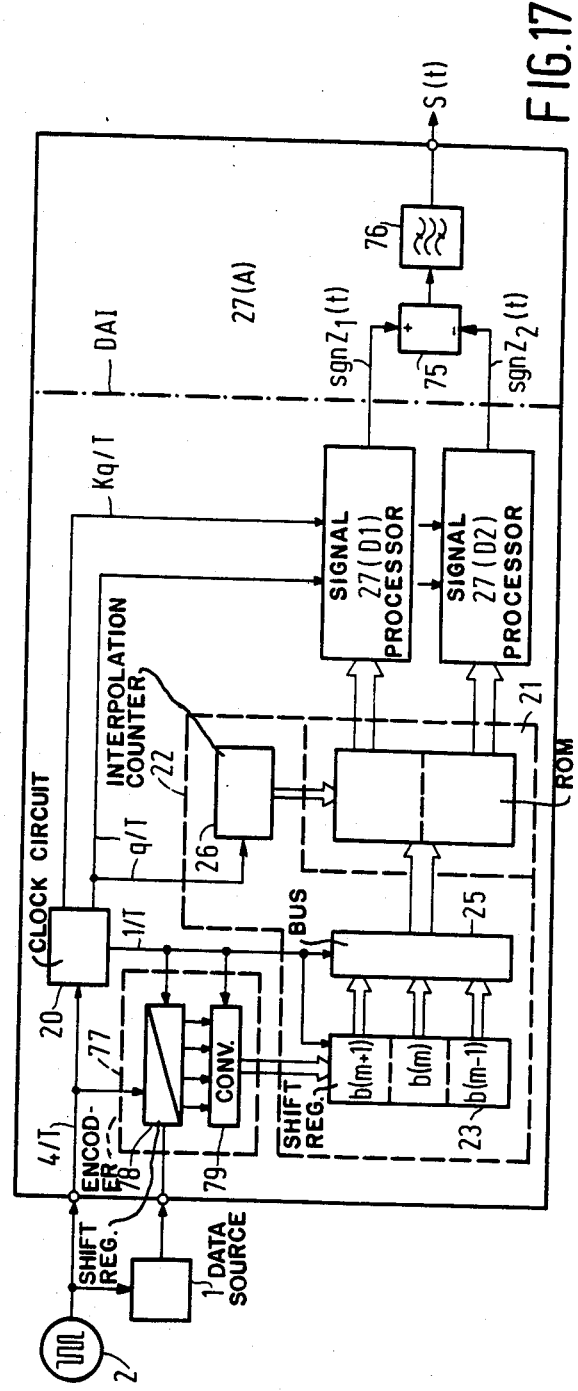
FIG. 17 shows a block diagram of a data transmitter operating in accordance with the principles shown in FIG. 15, arrangements according to the invention being used for generating the two phase-modulated, constantamplitude signals.

The block diagram of FIG. 17 now illustrates how the invention can be used in a data transmitter generating a modulated signal $S(t)$ having an AM-PM constellation as shown in diagram a of FIG. 16 and utilizing the principles of the diagram in FIG. 15. Elements of FIG. 17 corresponding to those in FIGS. 4 and 5 already described in the foregoing are given the same reference numerals.

In the transmitter of FIG. 17, clock signal source 2 synchronizes data source 1 such that the binary data signals are applied to an encoding circuit 77 with a bit rate $4/T$. Encoding circuit 77 comprises a 4-bit shift register 78 which receives this bit stream in the serial form and divides it into quadbits $a(m)$ available in the parallel form with the symbol rate $1/T$ at the output of the 4 shift register elements. However, these quadbits $a(m)$ are still not representative of the signal points $a(mT)$, $\phi(mT)$ in diagram a of FIG. 16, since the encoding rule of the Recommendation V.29 implies that the second, third and fourth bits in each quadbit $a(m)$ determine the phase change relative to the absolute phase $\phi(mT-T)$ at the preceding symbol instant $t=mT-T$. To obtain quadbits $b(m)$ whose second, third and fourth bits represent the absolute phase $\phi mT)$ in diagram a of FIG. 16 and whose first bit represents the relative amplitude $A(mT)$ associated with this absolute phase $\phi(mT)$, encoding circuit 77 also comprises a converter 79 which in response to the quadbit $a(m)$ accumulates the consecutive phase changes and represents the result modulo-$2\pi$ as an absolute phase $\phi(mT)$ with the second, third and fourth bits of quadbits $a(m)$.

The addresses for first read-only memory 21 are now derived from these quadbits $b(m)$ with the aid of an addressing circuit 22 whose structure has already been described in greater detail. In FIG. 17, a length $pT=3T$ is chosen for the central interval to which the desired impulse response is limited, so that shift register 23 has a length of 3 elements and a width of 4 bits. Quadrant counter 24 used in the described TFM transmitters is however absent in FIG. 17 as the phase $\phi(t)$ between the instants $t=mT$ and $t=mT+T$ now does not always remain in the same phase quadrant as will be apparent from diagram a in FIG. 16 in which one of the possible trajectories of the amplitude-phase pair $A(t)$, $\phi(t)$ within a time interval 3T is represented by a broken line. The contents of shift register 23 (12 bits) and the counting position of modulo-q counter 26 (3 bits at an interpolation factor $q=8$) form the address first read-only memory 21 which is read at a sampling rate $f_s=q/T$. Connected to first read-only memory 21 are two signal processors 27 (D1) and 27 (D2) for processing the read values to form the two-level signals sgn[$Z_1(t)$] and sgn[$Z_2(t)$] which are processed in an output stage 27(A) in the same way as in stage 72 of FIG. 15.

The values stored in first read-only memory 21 can represent different types of modulation parameters depending on the type of signal processor 27(D1), 27(D2) used in FIG. 17. When these signal processors of FIG. 17 are of a similar structure as the signal processor 27(D) of FIG. 4, the two control signals TS and ZI for zero-crossing generator 41 are derived from samples $Z_1(t_i)$ and $Z_2(t_i)$ of the phase-modulated signals $Z_1(t)$ and $Z_2(t)$ given in formula (43), which are obtained in control generator 45 with the aid of digital quadrature modulation circuit 35 connected to first read-only memory 21. In this case, digital numerical values representing the modulation parameters cos $[\alpha t_i)]$, sin $[\alpha(t_i)]$ for processor 27(D1) and the modulation parameters cos $[\beta(t_i)]$, sin $[\beta(t_i)]$ for processor 27(D2) are stored in first read-only memory 21 of FIG. 17, $\alpha(t)$ and $\beta(t)$ being the phases of the signals $Z_1(t)$ and $Z_2(t)$ calculated from the values of the amplitude-phase pair $A(t)$, $\phi(t)$ with the aid of formulae (42).

The signal processors in FIG. 17 can however alternatively be of a similar structure as signal processor 27(D) of FIG. 9 or as signal processor 27(D) of FIG. 10. In the first case, the values stored in read-only memory 21 of FIG. 17 represent the values of the modulation parameters $\theta_1(t_i)$ for processor 27(D1) and the modulation parameter $\theta_2(t_i)$ for processor 27(D2), the parameters $\theta_1(t)$ and $\theta_2(t)$ being the argument of the signals $Z_1(t)$ and $Z_2(t)$ corresponding therewith in accordance with the relations:

$$Z_1(t) = \sin[\theta_1(t)]$$

$$Z_2(t) = \sin[\theta_2(t)] \qquad (48)$$

and which consequently can be calculated on the basis of formulae (43). In the second case, the control signals TS and ZI for zero-crossing generator 41 are themselves stored as modulation parameters in read-only memory 21 of FIG. 17, these control signals TS and ZI for each of the signal processors 27(D1), 27(D2) being determined in the manner described in section D(5) by applying formulae (35) and (36) to the value of the respective arguments $\theta_1(t)$ and $\theta_2(t)$ at the instants $t_{i-1}$ and $t_i$.

What is claimed is:

1. An arrangement for generating an analog angle modulated carrier signal having a substantially constant amplitude, and a total phase variation produced by data signals of a given symbol frequency $1/T$ in a period of a first clock frequency of at most $\pi$ radians comprising:

a clock circuit synchronized with the symbol frequency 1/T for producing a first clock signal having a frequency q/T, where q is an integer greater than 1;

a first read-only memory for storing in addressable locations digital numerical values representing a function of the carrier signal phase $\phi(t)$ including magnitude and sign bits;

an addressing circuit controlled by the first clock signal and responsive to a predetermined number of consecutive data symbols for producing addresses at a rate of q/T for reading said digital numerical values from said first read-only memory; and, a zero-crossing generator connected to receive said digital numerical value comprising:

means for generating a zero-crossing indication signal when the modulated carrier signal changes phase;

means for generating a numerical time setting signal;

a delay circuit controlled by the first clock signal and responsive to said numerical time-setting signal for producing a set pulse having a presettable time delay of at most T/q relative to said first clock signal;

a gate circuit controlled by said first clock signal for passing said set pulse in response to said zero-crossing indication signal;

a bistable pulse generator connected to the gate circuit for producing a two-level signal having a level transition which occurs at the instant set pulses are received from said gate circuit; and a bandpass filter coupled with the pulse generator and having a center frequency of the carrier frequency of said angle modulated carrier signal.

2. An arrangement as claimed in claim 1, wherein the values stored in the first read-only memory represent the modulation parameters $\cos[\phi(t)]$ and $\sin[\phi(t)]$, $\phi(t)$ being the phase of the analog angle-modulated carrier signal, and further including a control generator for producing the time-setting and zero-crossing indication signals, the control generator comprising a digital quadrature modulation circuit connected directly to the first read-only memory for producing a digital signal having magnitude and sign bits at a sample rate q/T which represents the analog angle-modulated carrier signal, and further comprising a second read-only memory for storing in addressable locations digital numerical values of the time-setting signal, a sign detector for producing the zero-crossing indication signal and a delay circuit for delaying by one sample period T/q the digital signal produced by the quadrature modulation circuit, the respective magnitude bits of a sample of the digital signal and the simultaneously occurring sample of the delayed digital signal together constituting an address for the second read-only memory, and the respective sign bits of these two samples constituting the input signal for the sign detector.

3. An arrangement as claimed in claim 1, wherein the values stored in the first read-only memory represent samples of the modulation parameter $\theta(t)$, where $\theta(t) = \omega_c t + \phi(t)$ is the argument of the analog angle-modulated carrier signal having carrier frequency $\omega_c$ and phase $\phi(t)$, and further including a control generator for producing the time-setting and zero-crossing indication signals, the control generator comprising a second read-only memory for storing in addressable locations digital numerical values of the time-setting signal, a delay circuit for delaying by a period T/q the digital output signal of the first read-only memory, and an adder for forming a digital sum signal in response to the respective magnitude bits of a sample of the digital output signal and the simultaneously occurring sample of the delayed digital output signal, the magnitude bits of a sample of the digital sum signal and the magnitude bits of the simultaneously occurring sample of the delayed digital output signal together constituting an address for the second read-only memory, and a sign detector receiving the respective sign bits of simultaneously occurring samples of the non-delayed and the delayed digital output signals and producing the zero-crossing signal.

4. An arrangement as claimed in claim 1, wherein values stored in the first read-only memory represent the time-setting and zero-crossing indication signals as modulation parameters of the analog angle-modulated carrier signal and the zero-crossing generator in the signal processor is directly connected to the first read-only memory.

5. An arrangement as claimed in claim 1, wherein the time-setting signal is quantised with k bits, and the delay circuit of the zero-crossing generator is constituted by a presettable k-bit down-counter having a presetting circuit controlled by the first clock signal for setting the down-counter to a counting position corresponding to the k bits of the time-setting signal, said down-counter receiving at its counting input a second clock signal produced by the clock circuit and having a frequency Kq/T where $K=2^k$ and producing on reaching its zero position an output pulse which is applied as set pulse to the gate circuit.

6. An arrangement as claimed in claim 1, wherein the time-setting signal is quantized with k bits, and the delay circuit of the zero-crossing generator is constituted by a number of $2^n$ presettable (k−n)-bit down-counters and a switch having $2^n$ inputs, n being an integer with $1 \leq n \leq k$, the down-counters each comprising a presetting circuit controlled by the first clock signal for setting each down-counter to a counting position corresponding to the (k−n) most significant bits of the time-setting signal and receiving at their counting input second clock signals produced by the clock circuit and having a frequency $Ko/(2^n T)$ and respective mutual delays T/Kq, where $K=2^k$, said down-counters on reaching their counting positions applying an output pulse to respective inputs of the switch, said switch being controlled by the n least significant bits of the time-setting signal such that only a pulse at the input corresponding to these n bits is applied as set pulse to the gate circuit.

7. An arrangement as claimed in claim 1, the time-setting signal being quantized with k bits, and the delay circuit of the zero-crossing generator is constituted by a presettable (k−n)-bit down counter whose counting input receives a second clock signal produced by the clock circuit and having a frequency $Kq/(2^n T)$ through a series of n insertable delay lines having respective time delays increasing from a value of T/Kq by each time a factor of 2 until a value $2^{n-1}/Kq$, where n is an integer with $1 < n < k$ and $K = 2^k$, said down-counter comprising a presetting circuit controlled by the first clock signal for setting the down-counter to a counting position corresponding to the (k−n) most significant bits of the time-setting signal and said series of delays comprising switching means for inserting a time delay corresponding to the n least significant bits of the time-setting signal, the down-counter on reaching its zero position producing an output pulse which is applied as said set pulse to the gate circuit.

8. An arrangement as claimed in claim 4, wherein the first read-only memory r read-only memories each having the same contents and each having its address input connected to an r-output address distributor, and a read output to an r-input multiplexer, said address distributor and said multiplexer both being controlled by the first clock signal for cyclically distributing the read addresses and cyclically multiplexing the values read from, the r read-only memories.

* * * * *

UNITED STATES PATENT AND TRADEMARK OFFICE
CERTIFICATE OF CORRECTION

PATENT NO. : 4,672,634
DATED : June 9, 1987
INVENTOR(S) : KAH-SENG CHUNG ET AL

It is certified that error appears in the above-identified patent and that said Letters Patent is hereby corrected as shown below:

In the Claims:

Claim 6, line 12, "Ko" should be --Kq--.

Claim 7, line 9, delete "/" (first occurrence).

Claim 8, line 2, insert --comprises-- after "memory".

Signed and Sealed this

Sixteenth Day of February, 1988

Attest:

DONALD J. QUIGG

*Attesting Officer*       *Commissioner of Patents and Trademarks*